(12) United States Patent
Iihoshi et al.

(10) Patent No.: US 9,866,500 B2
(45) Date of Patent: Jan. 9, 2018

(54) COMMUNICATION APPARATUS, COMMUNICATION METHOD, COMMUNICATION SYSTEM AND PROGRAM

(71) Applicants: Takahiro Iihoshi, Tokyo (JP); Shuichi Karino, Tokyo (JP); Akira Tsuji, Tokyo (JP)

(72) Inventors: Takahiro Iihoshi, Tokyo (JP); Shuichi Karino, Tokyo (JP); Akira Tsuji, Tokyo (JP)

(73) Assignee: NEC Corporation, Tokyo (JP)

( * ) Notice: Subject to any disclaimer, the term of this patent is extended or adjusted under 35 U.S.C. 154(b) by 148 days.

(21) Appl. No.: 14/380,023

(22) PCT Filed: Feb. 27, 2013

(86) PCT No.: PCT/JP2013/001167
§ 371 (c)(1),
(2) Date: Aug. 20, 2014

(87) PCT Pub. No.: WO2013/128915
PCT Pub. Date: Sep. 6, 2013

(65) Prior Publication Data
US 2015/0036683 A1    Feb. 5, 2015

(30) Foreign Application Priority Data
Feb. 29, 2012  (JP) .................. 2012-042742

(51) Int. Cl.
*H04L 12/947* (2013.01)
*H04W 12/08* (2009.01)
*H04L 12/721* (2013.01)

(52) U.S. Cl.
CPC ............. *H04L 49/25* (2013.01); *H04L 45/44* (2013.01); *H04W 12/08* (2013.01)

(58) Field of Classification Search
CPC ......... H04L 45/28; H04L 45/04; H04L 45/22; H04L 45/60; H04L 47/783;
(Continued)

(56) References Cited

U.S. PATENT DOCUMENTS 7,478,156 B1 * 1/2009 Pereira .................. H04L 43/026
709/224
7,715,382 B2   5/2010 Lakshman et al.
(Continued)

FOREIGN PATENT DOCUMENTS

JP  2006-135971 A   5/2006
JP  2006-135975 A   5/2006
(Continued)

OTHER PUBLICATIONS

International Search Report corresponding to PCT/JP2013/001167 dated Apr. 9, 2013 (2 pages).
(Continued)

*Primary Examiner* — Jung-Jen Liu
(74) *Attorney, Agent, or Firm* — Wilmer Cutler Pickering Hale & Dorr

(57) ABSTRACT

A communication apparatus comprises: a plurality of storage units adapted to store a process corresponding to a packet; a first unit that refers to at least one of the plurality of storage units and searches for a process corresponding to an incoming packet; and a second unit that queries, from among a plurality of control apparatuses, a control apparatus associated with a storage unit, in which the first unit has detected a predetermined condition, for a process corresponding to the incoming packet.

18 Claims, 31 Drawing Sheets

(58) Field of Classification Search
CPC .............. H04L 12/4633; H04L 49/3063; H04L 49/1546; H04L 41/0893; H04L 12/5689; H04L 12/5696; H04L 45/586; H04L 41/0896; H04L 49/70; H04L 67/28; G06F 15/17312; G06F 11/07

See application file for complete search history.

(56) References Cited

U.S. PATENT DOCUMENTS

| | | | |
|---|---|---|---|
| 8,068,408 B2 | 11/2011 | Ansari et al. | |
| 8,432,787 B2 | 4/2013 | Ansari et al. | |
| 2006/0092940 A1* | 5/2006 | Ansari | H04L 45/00 370/392 |
| 2006/0092974 A1* | 5/2006 | Lakshman | H04L 45/04 370/469 |
| 2010/0034088 A1* | 2/2010 | Sakata | H04L 41/5022 370/235 |
| 2011/0317559 A1* | 12/2011 | Kern | H04L 45/02 370/235 |
| 2012/0155467 A1* | 6/2012 | Appenzeller | H04L 45/54 370/392 |
| 2012/0257529 A1* | 10/2012 | Ehara | H04L 12/66 370/252 |
| 2012/0281520 A1 | 11/2012 | Ansari et al. | |
| 2013/0010600 A1* | 1/2013 | Jocha | H04L 43/026 370/236.2 |
| 2013/0024579 A1* | 1/2013 | Zhang | H04W 16/18 709/230 |
| 2013/0054761 A1* | 2/2013 | Kempf | H04L 12/4633 709/220 |
| 2013/0058208 A1* | 3/2013 | Pfaff | H04L 12/4633 370/217 |
| 2013/0070762 A1* | 3/2013 | Adams | H04L 49/70 370/389 |
| 2013/0223444 A1* | 8/2013 | Liljenstolpe | H04L 61/103 370/392 |
| 2013/0246655 A1* | 9/2013 | Itoh | H04L 12/56 709/238 |

FOREIGN PATENT DOCUMENTS

| | | |
|---|---|---|
| JP | 2008-219530 A | 9/2008 |
| JP | 2011-082834 A | 4/2011 |
| JP | 2011-101245 A | 5/2011 |
| JP | 2011-160363 A | 8/2011 |

OTHER PUBLICATIONS

Nick McKeown, et al., "OpenFlow: Enabling Innovation in Campus Networks," Mar. 14, 2008 (6 pages), Internet URL:http://www.openflowswitch.org/documents/openflow-wp-latest.pdf.

"OpenFlow Switch Specification," Version 1.1.0 (Wire Protocol 0x02), Feb. 28, 2011, (56 pages), Internet URL:http://openflowswitch.org/documents/openflow-spec-v1.1.0.pdf.

Rob Sherwood, et al., OpenFlow, "FlowVisor: A Network Virtualization Layer," Oct. 14, 2009 (15 pages), Internet URL:http://www.openflow.org/downloads/technicalreports/openflow-tr-2009-1-flowvisor.pdf.

Written Opinion corresponding to PCT/JP2013/001167 dated Apr. 9, 2013 (3 pages).

* cited by examiner

| Priority | Matching Rule | Action |
|---|---|---|
| a | Flow A | CONTROLLER: A |
| ... | ... | ... |
| a – k | Flow B | Output |
| ... | ... | ... |
| a – n | Flow C | CONTROLLER: B |
| ... | ... | ... |
| a – m | Flow D | CONTROLLER: C |

FLOW TABLE 125

[Fig. 7]

| a | Flow A | CONTROLLER: A | Others: ReadOnly |

ENTRY EDIT COMMAND

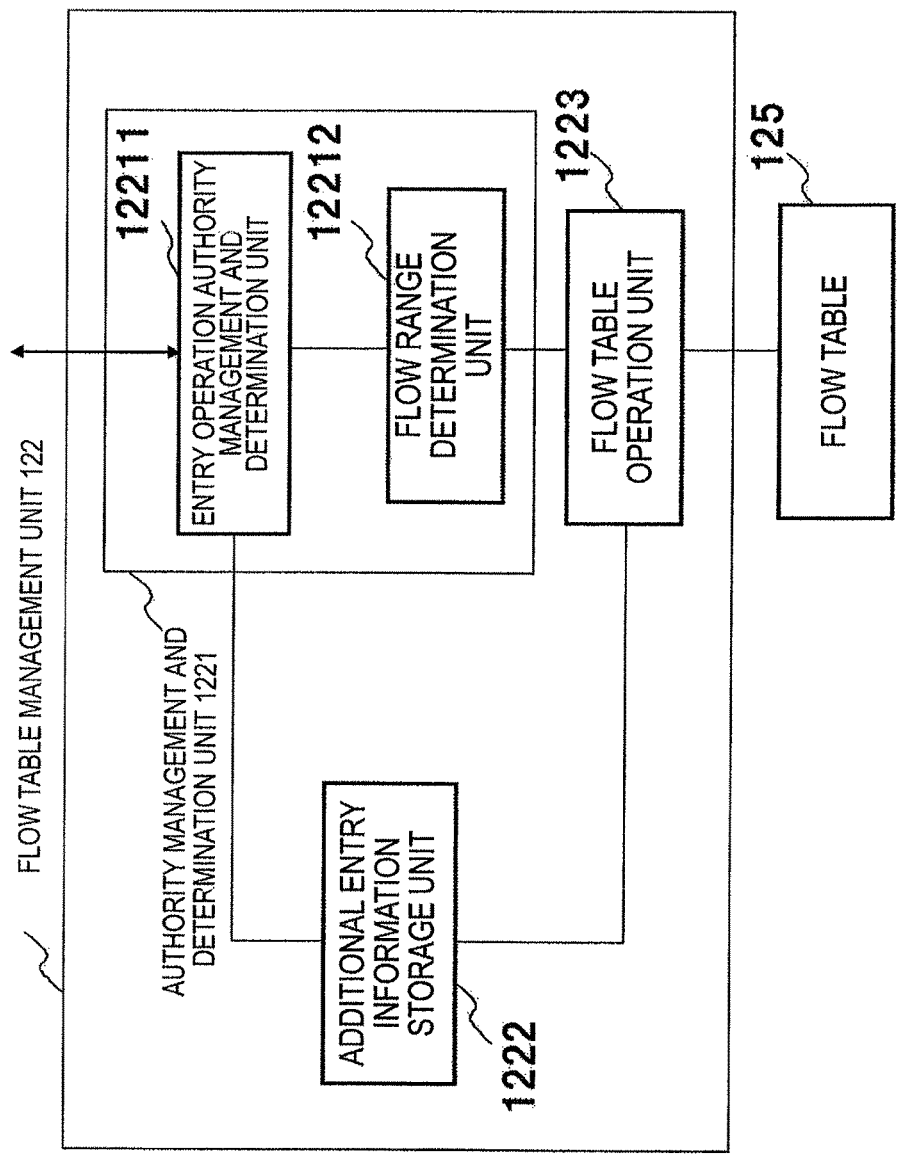

[Fig. 9]

| FLOW TABLE | | | ADDITIONAL ENTRY INFORMATION | |
|---|---|---|---|---|
| Priority | Matching Rule | Action | Permission | Owner |
| a | Flow A | CONTROLLER: A | A: ReadWrite, B: ReadOnly | A |
| ... | ... | ... | ... | ... |
| a-k | Flow B | Output | A: ReadWrite, B: ReadWrite | B |
| ... | ... | ... | ... | ... |
| a-n | Flow C | CONTROLLER: B | A: ReadWrite, B: ReadOnly | A |
| ... | ... | ... | ... | ... |
| a-m | Flow D | CONTROLLER: A | A: ReadWrite | A |

[Fig. 10]
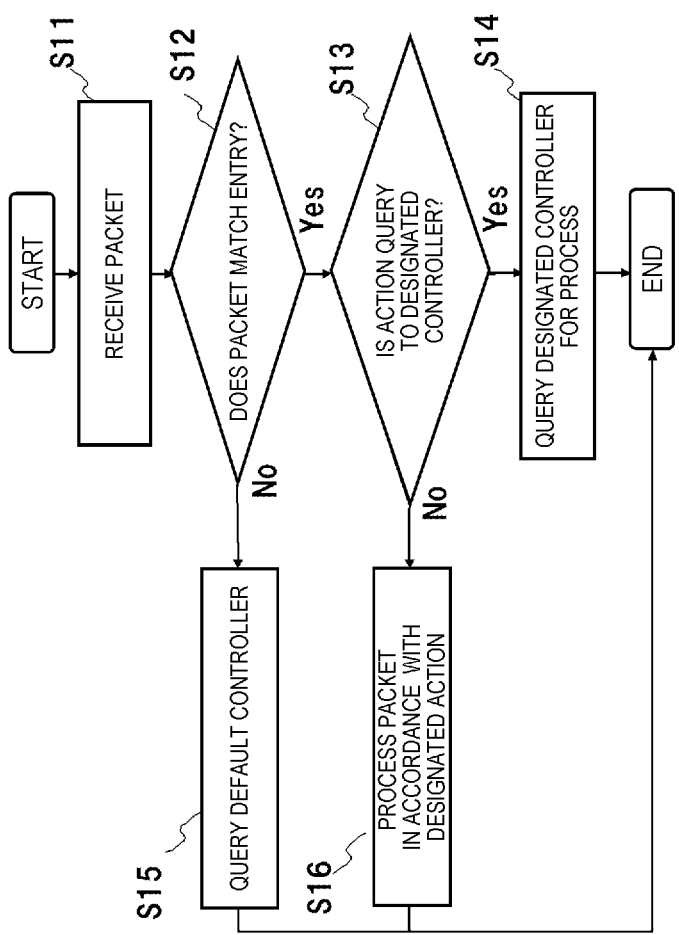

[Fig. 11]
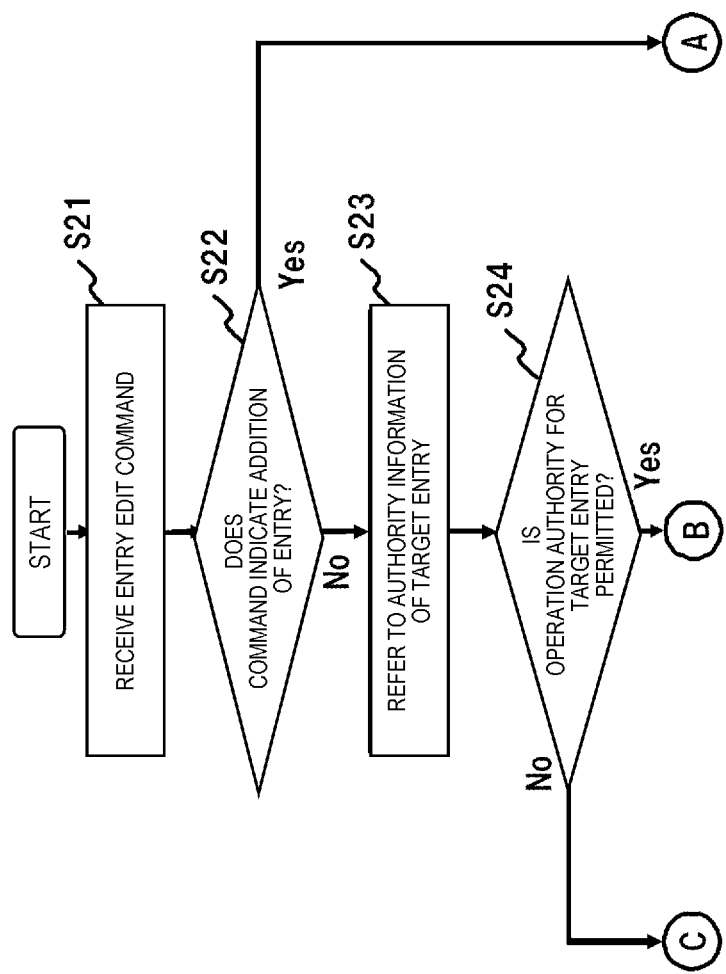

[Fig. 12]
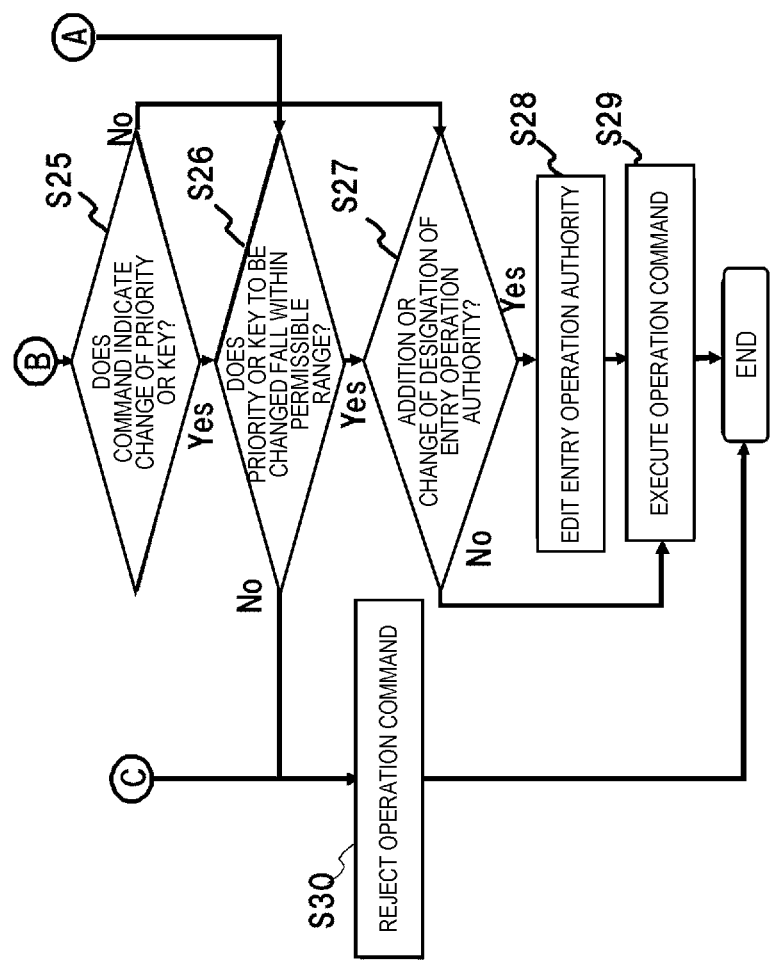

[Fig. 13]
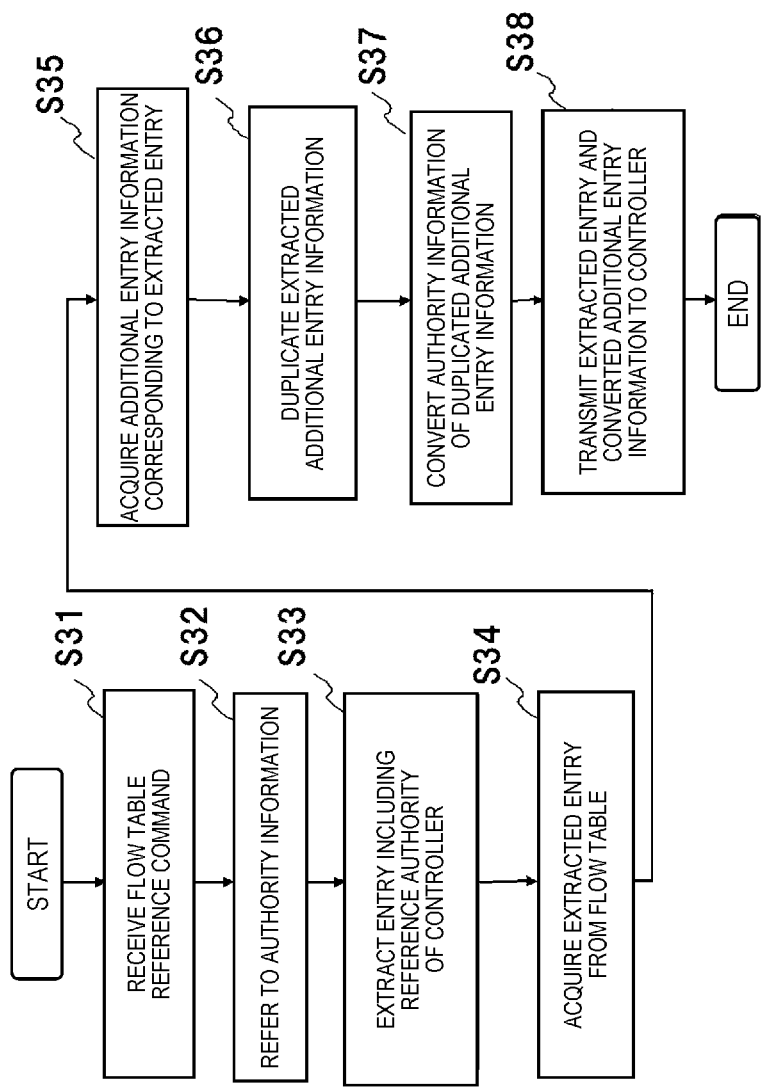

[Fig. 15]

FLOW TABLE 225

| Priority | Matching Rule | Action | Permission | Owner |
|---|---|---|---|---|
| a | Flow A | CONTROLLER: A | A: ReadWrite, B: ReadOnly | A |
| ... | ... | ... | ... | ... |
| a-k | Flow B | Output | A: ReadWrite, B: ReadWrite | B |
| ... | ... | ... | ... | ... |
| a-n | Flow C | CONTROLLER: B | A: ReadWrite, B: ReadOnly | A |
| ... | ... | ... | ... | ... |
| a-m | Flow D | CONTROLLER: A | A: ReadWrite | A |

[Fig. 16]
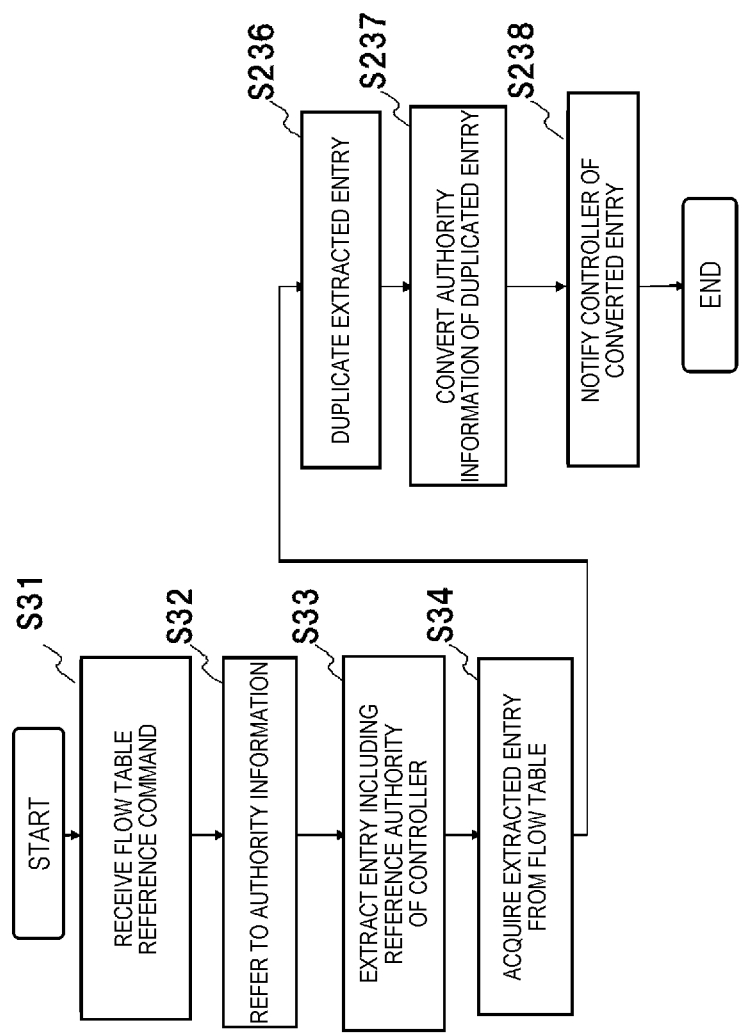

[Fig. 18]

CONTROLLER FLOW TABLE 3213

| Priority | Matching Rule | Destination Controller |
|---|---|---|
| a | Flow A | A |
| a-n | Flow B | B |
| a-m | Flow C | A |

[Fig. 19]
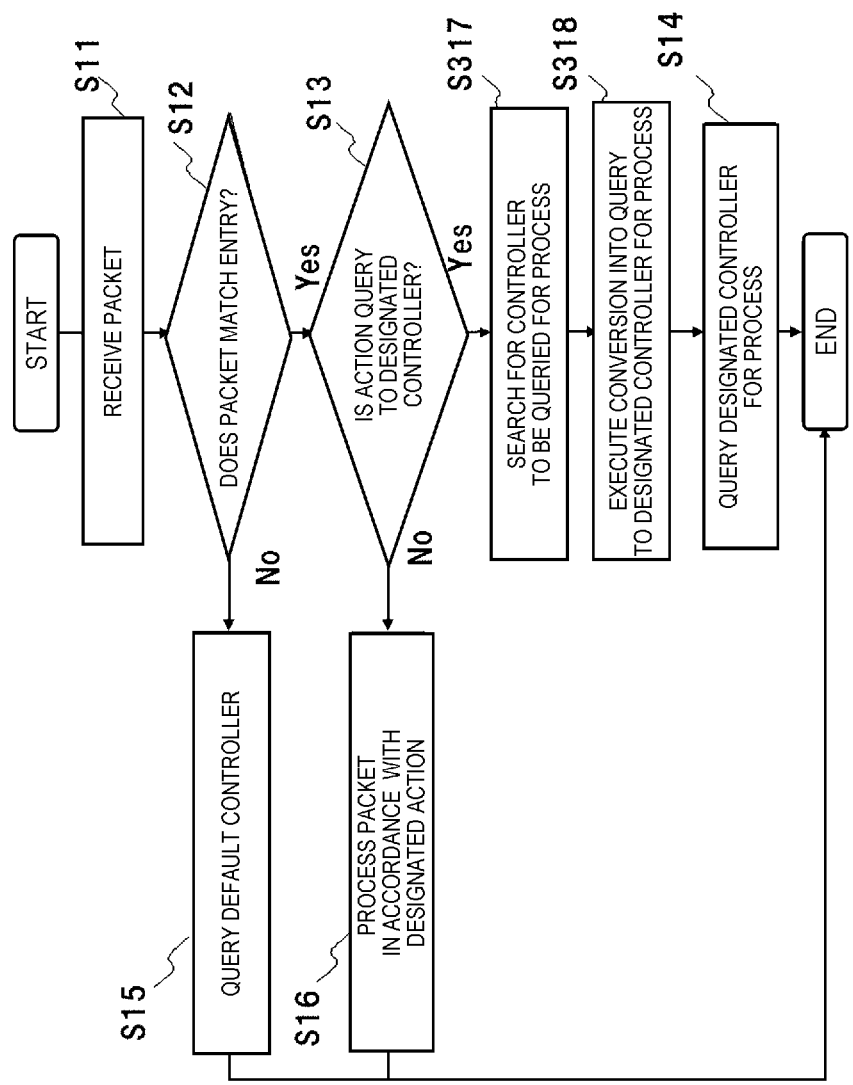

[Fig. 20]
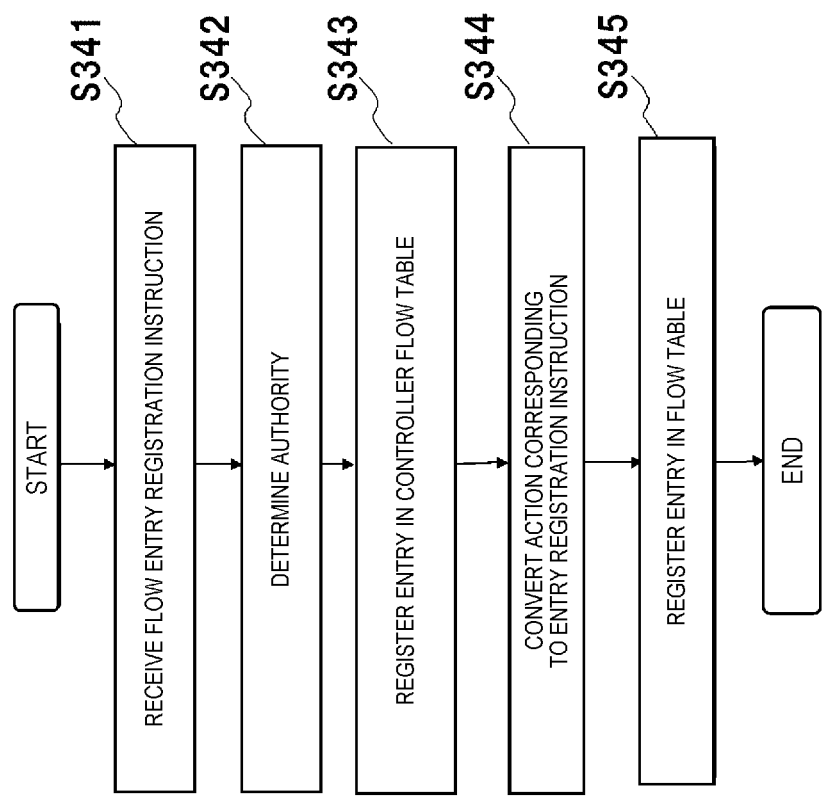

ACCESS AUTHORITY MANAGEMENT TABLE 530

| Table ID | Controller ID | Authority |
|---|---|---|
| 0 | A | Read/Write |
| 0 | B | ReadOnly |
| 1 | A | Read/Write |
| 1 | B | Read/Write |

[Fig. 27]

CHANGE AUTHORITY MANAGEMENT TABLE 531

| Table ID | Controller ID | Authority |
|---|---|---|
| 0 | A | ・Target: A/B<br>・Read/Write |
| 0 | B | ・Target: B<br>・Read |
| 1 | A | ・Target: A/B<br>・Read/Write |
| 1 | B | ・Target: B<br>・Read/Write |

[Fig. 28]

[Fig. 29]

CHANGE AUTHORITY MANAGEMENT TABLE 532

| Table ID | Controller ID | Authority |
|---|---|---|
| 0 | A | ・Target: A/B |
| 0 | B | Not Permitted |
| 1 | A | ・Target: A/B |
| 1 | B | ・Target: B |

[Fig. 30]

| Table ID | Controller ID | Command |
|---|---|---|
| 0 | Source: B<br>Target : B | Permission Req: Linkage |

Association Setting Request Command

[Fig. 31]
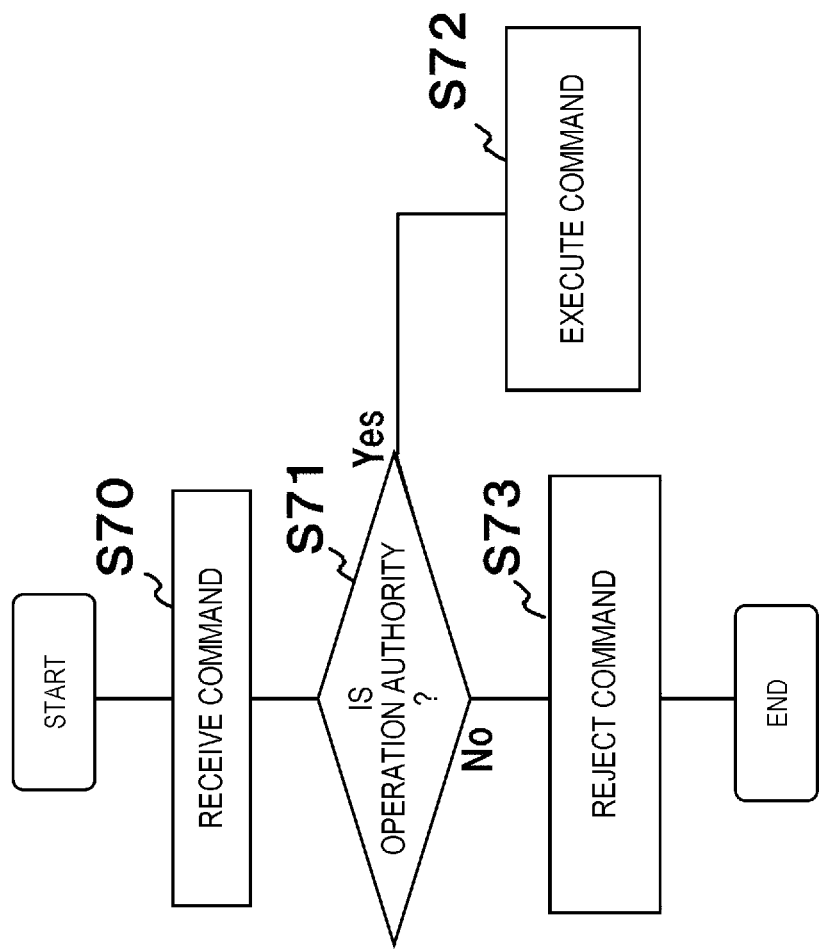

COMMUNICATION APPARATUS, COMMUNICATION METHOD, COMMUNICATION SYSTEM AND PROGRAM

CROSS-REFERENCE TO RELATED APPLICATIONS

This application is a national stage application of International Patent Application No. PCT/JP2013/001167, filed on Feb. 27, 2013, which claims priority from Japanese Patent Application No. JP2012-042742, filed on Feb. 29, 2012, the contents of which are hereby incorporated in their entirety by reference into this specification.

FIELD

The present invention relates to a communication apparatus connected to a network, a communication method, a communication system and a program.

BACKGROUND

In recent years, a technique called OpenFlow has been proposed. The OpenFlow is disclosed in Non Patent Literatures (NPLs) 1 and 2 and Patent Literatures (PTLs) 1 and 2. In the OpenFlow, a communication method between an OpenFlow switch (OFS) function and an OpenFlow controller (OFC), which is a control apparatus for the OFS function, is defined. These OFS and OFC are connected to each other via a control path called a secure channel. In addition, the OFS is controlled by a single OFC.

The OFS includes a flow table. In the flow table, at least a header field for identifying the flow of a packet and a process corresponding to the packet are paired and registered as an entry. The header field for identifying a packet is also referred to as a matching rule. The header field is formed by a plurality of tuples, and a wildcard can be designated for each tuple. By designating a wildcard, a flow range can be represented as a union. For example, it is possible to designate only the source IP (Internet Protocol) address in the header field of a certain entry and to set wildcards in the other tuples. In such case, the set entry represents a union of all flows transmitted from the designated IP address. Namely, all the packets transmitted from the designated IP address correspond to the set entry, irrespective of the destinations of the packets.

In addition, the process corresponding to a packet is also referred to as an action. Examples of the action include at least forwarding to a designated port, forwarding to the OFC, forwarding back to an ingress port, and discarding. Forwarding to a designated port is used for forwarding a packet to a switch at the next hop. Forwarding to the OFC is mainly used for querying a packet processing method.

When receiving a packet, first, the OFS searches the flow table. If an entry matching the incoming packet exists, the OFS processes the packet, in accordance with an action in the matched entry. Since a priority can be set in an entry, if a packet matches a plurality of entries, the OFS uses an action in an entry with the highest priority.

If the flow table does not include any entries matching the incoming packet, the OFS queries the OFC for a process to be executed on the incoming packet. In such case, the OFS forwards part of the packet or the entire packet to the OFC via the secure channel. After receiving the query, as needed, the OFC adds an entry in the flow table and notifies the OFS of a processing method.

In addition, PTLs 3 and 4 disclose a network architecture including: a control apparatus that has a control function; and a switch that has a forwarding function and that is controlled by the control apparatus.

PTL 1:
Japanese Patent Kokai Publication No. JP2011-082834A
PTL 2:
Japanese Patent Kokai Publication No. JP2011-101245A
PTL 3:
Japanese Patent Kokai Publication No. JP2006-135971A
PTL 4:
Japanese Patent Kokai Publication No. JP2006-135975A
NPL 1:
Nick McKeown, and seven others, "OpenFlow: Enabling Innovation in Campus Networks," [Searched on Jun. 28, 2011], Internet <URL: http://www.openflowswitch.org/documents/openflow-wp-latest.pdf>
NPL 2:
"OpenFlow Switch Specification Version 1.1.0 (Wire Protocol 0x01)," Dec. 31, 2009, [Searched on Feb. 16, 2012], Internet <URL: http://www.openflowswitch.org/documents/openflow-spec-vp1.1.0.pdf>

SUMMARY

The entire disclosures of the above mentioned PTLs and NPLs are incorporated herein by reference thereto. The following analyses are given by the present invention.

The OpenFlow disclosed in NPLs 1 and 2 and PTLs 1 and 2 and the architecture disclosed in PTLs 3 and 4 are directed to a network system in which a single controller finely controls switch operations.

Thus, none of the Literatures in the above Citation List discloses a situation where a plurality of controllers exist and a method for controlling a switch by such plurality of controllers.

In addition, NPL 2 discloses a switch including a plurality of tables storing instructions set from a controller. However, NPL 2 does not disclose a method for controlling the correspondence relationship between the plurality of tables included in the switch and a plurality of controllers if such plurality of controllers exists.

According to a first aspect of the present invention, there is provided a communication apparatus, comprising:
a plurality of storage units adapted to store a process corresponding to a packet;
a first unit that refers to at least one of the plurality of storage units and searches for a process corresponding to an incoming packet; and
a second unit that queries, from among a plurality of control apparatuses, a control apparatus associated with a storage unit, in which the first unit has detected a predetermined condition, for a process corresponding to the incoming packet.

According to a second aspect of the present invention, there is provided a communication method, comprising:
by a communication apparatus, storing a process corresponding to a packet in at least one of a plurality of storage units;
referring to at least one of the plurality of storage units and searching for a process corresponding to an incoming packet; and
querying, from among a plurality of control apparatuses, a control apparatus associated with a storage unit, in which a predetermined condition has been detected in the searching, for a process corresponding to the incoming packet.

According to a third aspect of the present invention, there is provided a communication system, comprising:
a plurality of control apparatuses; and
a communication apparatus, wherein
the communication apparatus comprises:
a plurality of storage units adapted to store a process corresponding to a packet;
a first unit that refers to at least one of the plurality of storage units and searches for a process corresponding to an incoming packet; and
a second unit that queries, from among the plurality of control apparatuses, a control apparatus associated with a storage unit, in which the first unit has detected a predetermined condition, for a process corresponding to the incoming packet.

There is also provided a packet forwarding apparatus, comprising:
a plurality of storage units adapted to store a process corresponding to a packet;
a first unit that refers to at least one of the plurality of storage units and searches for a process corresponding to an incoming packet; and
a second means unit that queries, from among a plurality of control apparatuses, a control apparatus associated with a storage unit, in which the first unit has detected a predetermined condition, for a process corresponding to the incoming packet.

According to a fourth aspect of the present invention, there is provided a program, causing a computer arranged on a communication apparatus to execute:
storing a process corresponding to a packet in a plurality of storage units;
referring to at least one of the plurality of storage units and searching for a process corresponding to an incoming packet; and
querying, from among a plurality of control apparatuses, a control apparatus associated with a storage unit, in which a predetermined condition has been detected in the searching, for a process corresponding to the incoming packet.

The program may also be provides as a program product stored in a non-transitory computer-readable storage medium.

The present invention provides the following advantage, but not restricted thereto. According to the present invention, even when a plurality of controllers or control apparatuses controlling a switch or a communication apparatus exist, the switch or the communication apparatus can be controlled by a plurality of controllers or control apparatuses.

BRIEF DESCRIPTION OF THE DRAWINGS

FIG. 6 illustrates a configuration example of a flow table according to the second exemplary embodiment.

FIG. 7 illustrates an entry edit command according to the second exemplary embodiment. FIG. 8 illustrates a configuration example of the switch according to the second exemplary embodiment.

FIG. 9 illustrates additional entry information according to the second exemplary embodiment.

FIG. 10 is a flow chart illustrating an operation example according to the second exemplary embodiment.

FIG. 11 is a flow chart illustrating an operation example according to the second exemplary embodiment.

FIG. 12 is a flow chart illustrating an operation example according to the second exemplary embodiment.

FIG. 13 is a flow chart illustrating an operation example according to the second exemplary embodiment.

FIG. 15 illustrates a configuration example of a flow table according to the third exemplary embodiment.

FIG. 16 is a flow chart illustrating an operation example according to the third exemplary embodiment.

FIG. 18 illustrates a configuration example of a controller flow table according to the fourth exemplary embodiment.

FIG. 19 is a flow chart illustrating an operation example according to the fourth exemplary embodiment.

FIG. 20 is a flow chart illustrating an operation example according to the fourth exemplary embodiment.

FIG. 26 illustrates a configuration example according to the seventh exemplary embodiment.

FIG. 27 illustrates a configuration example according to the seventh exemplary embodiment.

FIG. 28 illustrates a configuration example according to the seventh exemplary embodiment.

FIG. 29 illustrates a configuration example according to the seventh exemplary embodiment.

FIG. 30 illustrates a configuration example according to the seventh exemplary embodiment.

FIG. 31 illustrates an operation example according to the seventh exemplary embodiment.

PREFERRED MODES

In the present disclosure, there are various possible modes, which include the following, but not restricted thereto. Next, exemplary embodiments of the present invention will be described in detail with reference to the drawings.

<First Exemplary Embodiment>
(Configuration)

Figure 1:
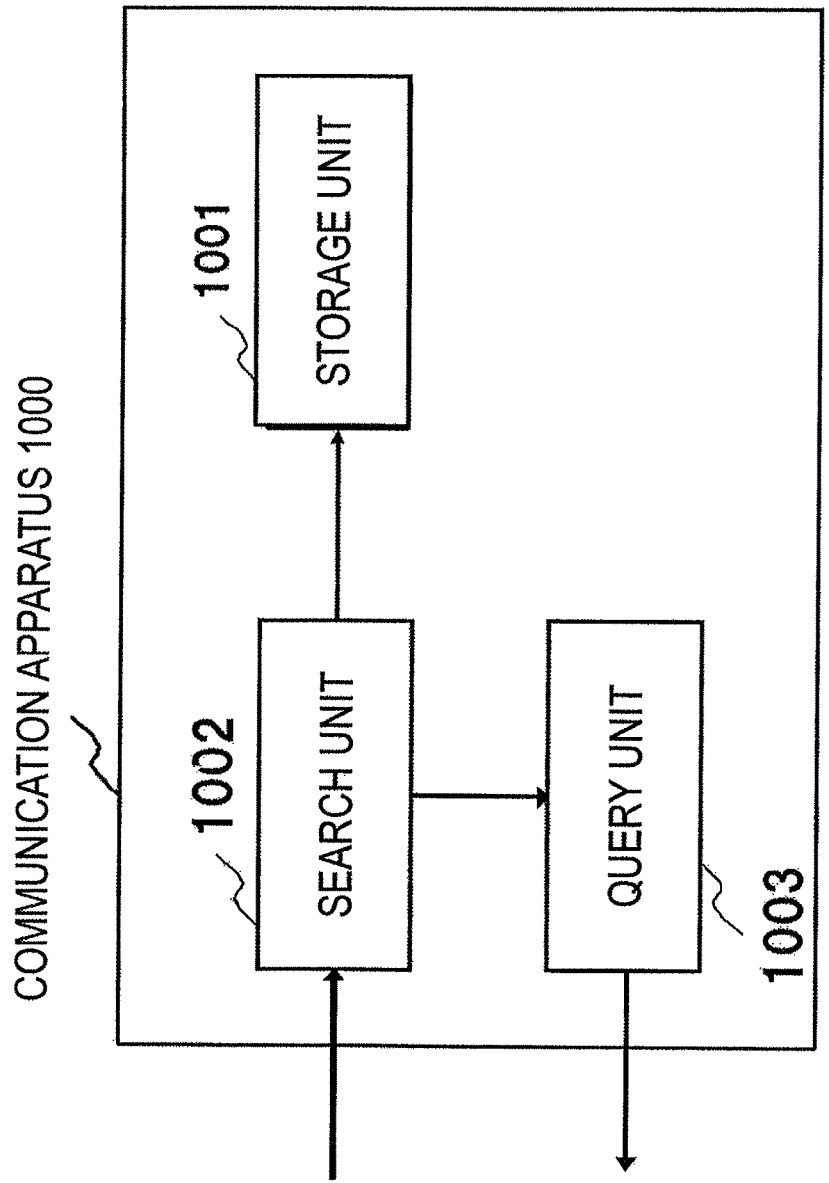
FIG. 1 illustrates a configuration example of a communication apparatus according to a first exemplary embodiment.

FIG. 1 illustrates a configuration example of a communication apparatus 1000 according to a first exemplary embodiment. In FIG. 1, the communication apparatus 1000 includes a storage means 1001, a search means 1002, and a query means 1003. In addition, the communication apparatus 1000 is connected to control apparatuses (not illustrated). The communication apparatus 1000 is controlled by the control apparatuses.

The storage means 1001 associates information for identifying a packet with a process corresponding to the packet and stores the associated information.

When receiving a packet, the search means 1002 searches the storage means 1001 for a process corresponding to the incoming packet.

If the process found by the search means 1002 is a query to a control apparatus, the query means 1003 executes the following operation. First, the query means 1003 determines a control apparatus to be queried, based on the entry in the storage means 1001 corresponding to the incoming packet. Next, the query means 1003 queries the control apparatus determined as the destination.

(Operation)

Figure 2:
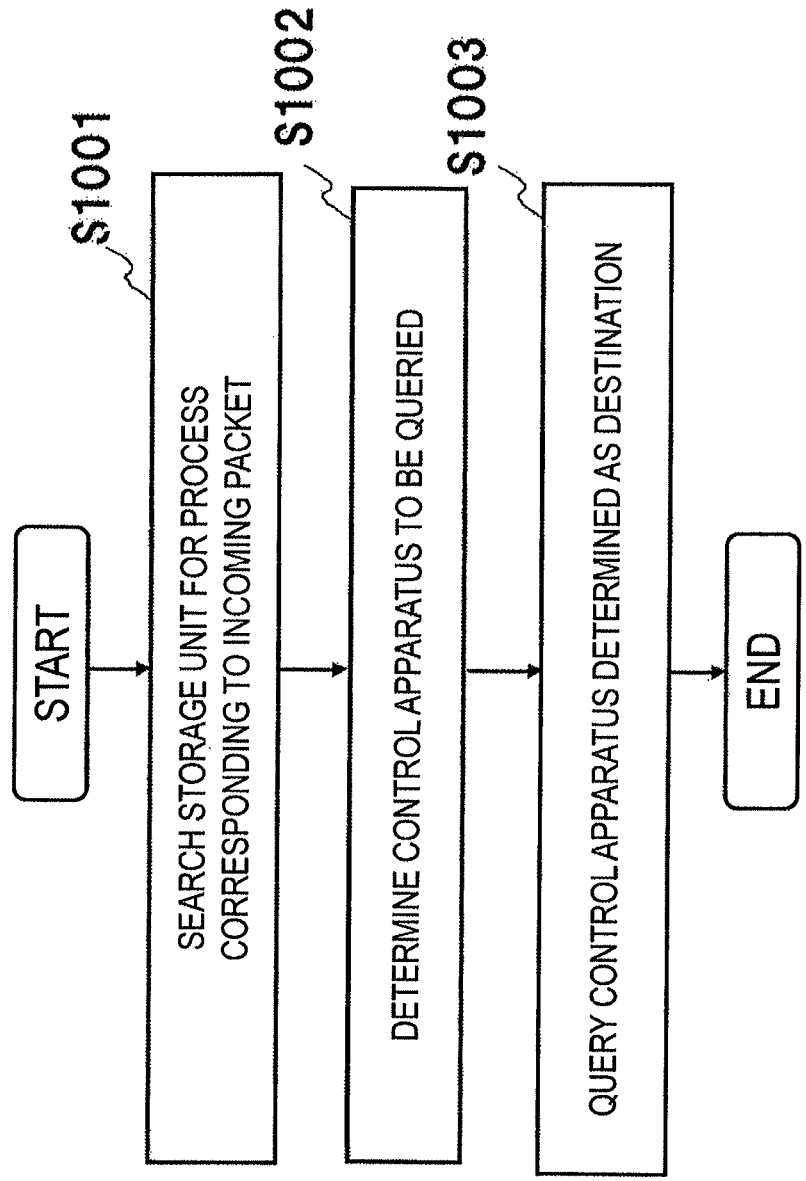
FIG. 2 is a flow chart illustrating an operation example according to the first exemplary embodiment.

Next, an operation according to the first exemplary embodiment will be described with reference to a flow chart in FIG. 2.

First, the search means 1002 searches the storage means 1001 for a process corresponding to an incoming packet (step S1001).

Next, if the process found by the search means 1002 is a query to a control apparatus, the query means 1003 determines a control apparatus to be queried, based on the entry in the storage means 1001 corresponding to the incoming packet (step S1002).

Next, the query means 1003 queries the control apparatus determined in step S1002 as the destination (step S1003).

As described above, in the first exemplary embodiment, the communication apparatus 1000 includes the storage means 1001, the search means 1002, and the query means 1003. However, other than the communication apparatus, another communication device such as a communication terminal may include the above means.

(Advantageous Effects)

As described above, according to the first exemplary embodiment, the communication apparatus determines and queries a control apparatus for a process to be executed on an incoming packet. Consequently, the queried control apparatus can determine a process corresponding to the incoming packet. Thus, according to the first exemplary embodiment, even when a plurality of control apparatuses controlling a communication apparatus exist, since a single control apparatus controlling the incoming packet can be determined, control of a communication apparatus by a plurality of control apparatuses can be achieved.

<Second Exemplary Embodiment>

(Configuration)

Figure 3:
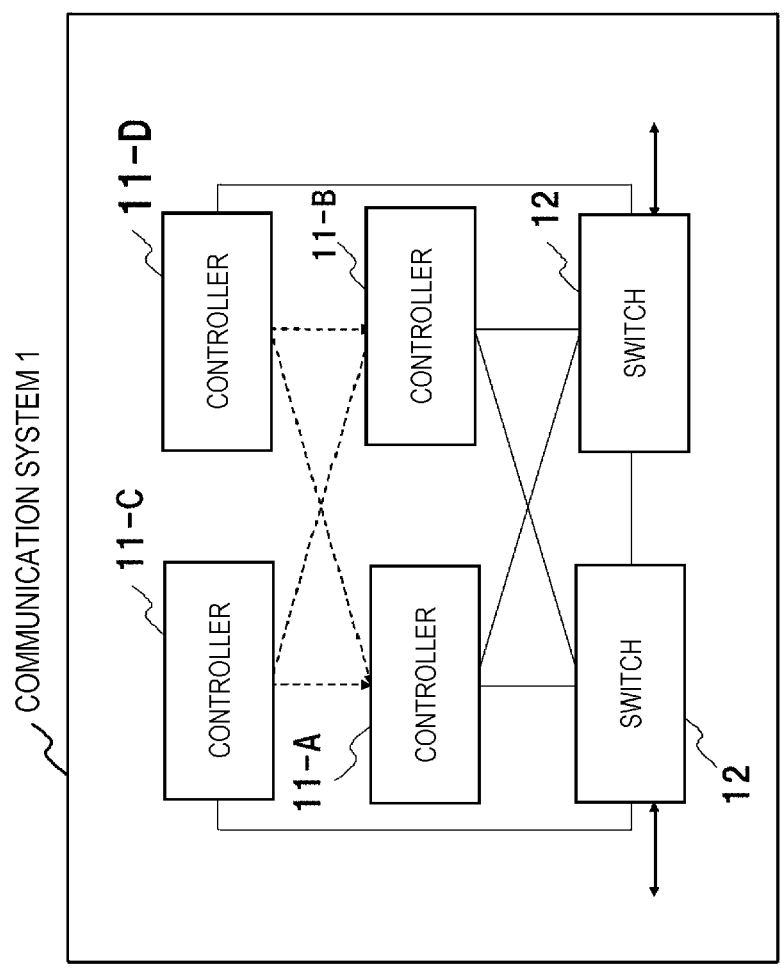
FIG. 3 illustrates a configuration example of a communication system according to a second exemplary embodiment.

FIG. 3 illustrates a configuration example of a communication system 1 according to a second exemplary embodiment. The communication system 1 includes a plurality of controllers 11 and a plurality of switches 12 that are connected to a network (not illustrated). In FIG. 3, there are four controllers 11 (controllers 11-A to 11-D). Hereinafter, unless these controllers need to be particularly distinguished, each of the four controllers will be referred to as a controller 11.

The switches 12 are connected to a plurality of controllers 11 via control paths. The controllers 11 are connected to the switches 12 controlled by the controllers 11 and exchange control messages with the switches 12.

In FIG. 3, there are two switches 12, and each of the switches 12 is connected to the controllers 11-A and 11-B. In addition, in FIG. 3, a connection relationship about the section from the controller 11-C to the controller 11-A is indicated by a dashed line and an arrow. Likewise, a connection relationship about the section from the controller 11-D to the controller 11-B is indicated by a dashed line and an arrow. This indicates that a certain controller can limit the communication range controlled by another controller.

Figure 4:
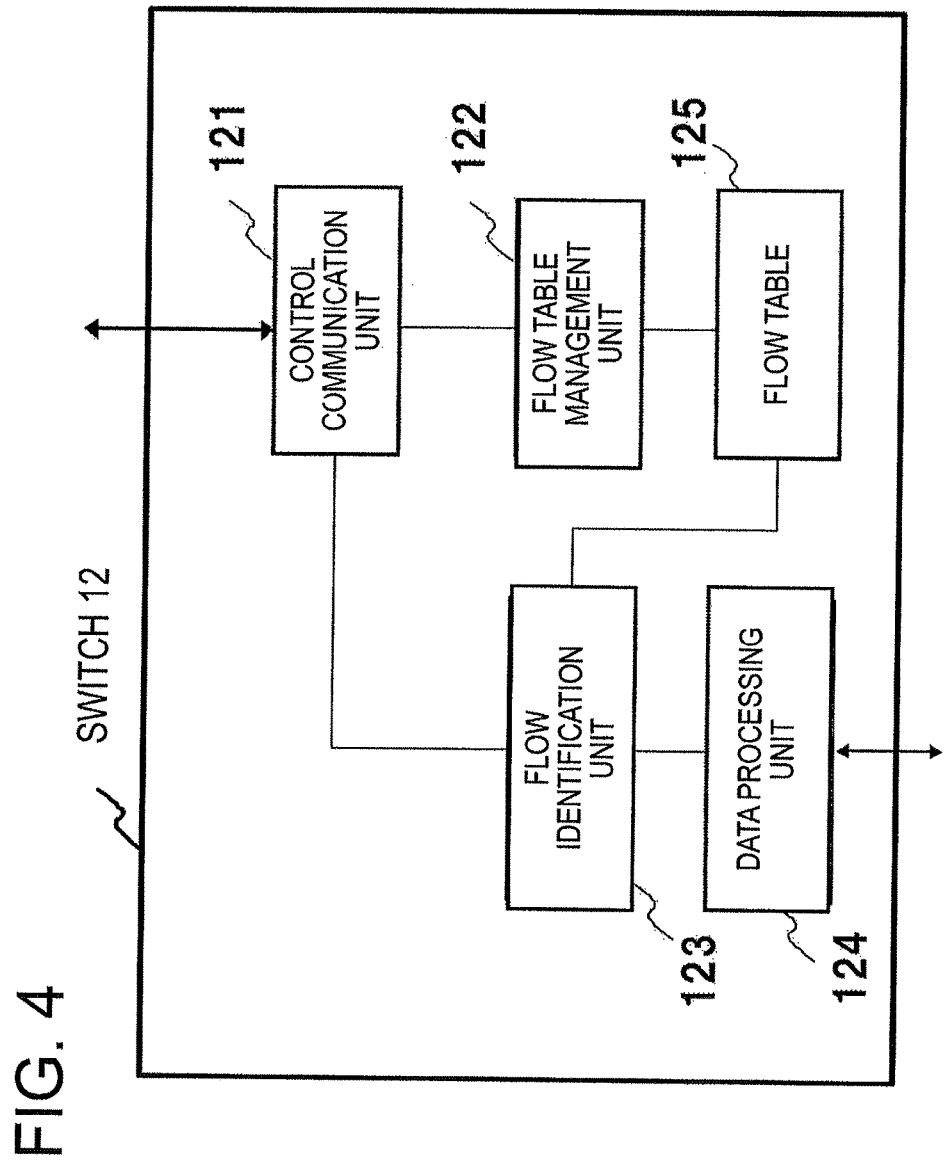
FIG. 4 illustrates a configuration example of a switch according to the second exemplary embodiment.

FIG. 4 illustrates a configuration example of a switch 12. In FIG. 4, the switch 12 includes a control communication means 121, a flow table management means 122, a flow identification means 123, a data processing means 124, and a flow table 125.

The control communication means 121 is connected to controllers 11, the flow table management means 122, and the flow identification means 123. When receiving a control message from a controller 11, the control communication means 121 transmits a control instruction to the flow table management means 122. When the flow table management means 122 transmits a control result, the control communication means 121 transmits a control message to the controller 11, as needed.

Figure 5:
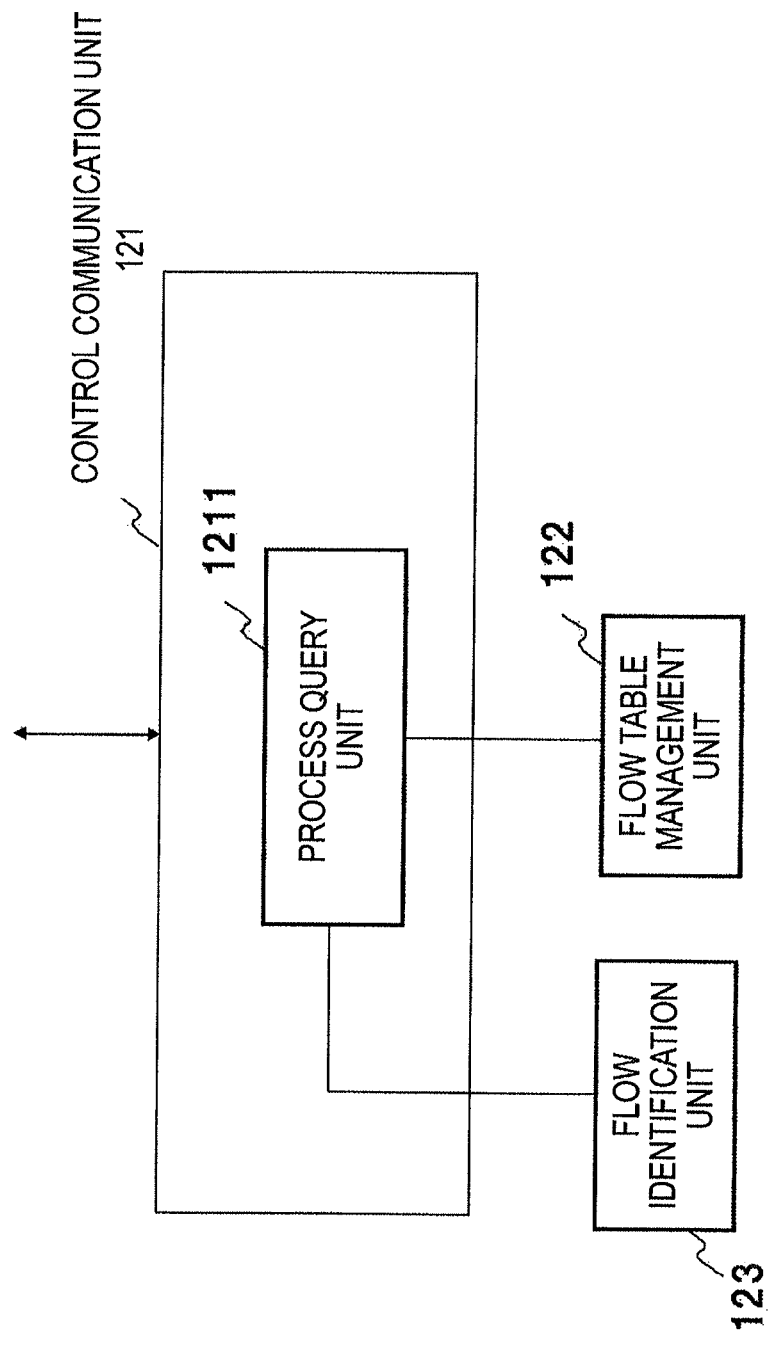
FIG. 5 illustrates a configuration example of the switch according to the second exemplary embodiment.

FIG. 5 illustrates a configuration example of the control communication means 121. In FIG. 5, the control communication means 121 includes a process query means 1211.

When receiving a query about a packet processing content and designation of a controller, the process query means 1211 queries a controller for a process.

The flow table management means 122 manages information described in the flow table 125. This flow table management means 122 will be described in detail below.

The flow identification means 123 identifies the flow to which a packet inputted to the data processing means 124 belongs. The flow identification means 123 is connected to the flow table 125. In addition, the flow identification means 123 searches the flow table 125 for a process corresponding to the identified flow.

The flow table 125 stores flow processing contents. For example, FIG. 6 illustrates a configuration of the flow table 125. An entry in the flow table 125 includes at least a priority, a matching rule, and an action. Priorities a, k, n, and m are natural numbers and satisfy the relationship k<n<m<a. Namely, in FIG. 6, entries are arranged in descending order of priority. As described in the above Background section, tuples such as an IP address or a MAC (Media Access Control) address are stored in a matching rule. In an action, a process to be executed on a packet matching the corresponding matching rule is described.

In the second exemplary embodiment, for a packet matching a matching rule, an action for querying a designated controller for a process can be registered. For example, if a packet belongs to flow A, a controller A is queried for a process. If a packet belongs to flow C, a controller B is queried for a process. In this way, for example, if a switch 12 receives a packet belonging to flow A, since the switch queries the controller A for a process, the controller A acquires an operation authority for flow A. A process described in the above Background section can be registered in an action. For example, if a packet belongs to flow B, the switch 12 forwards the packet to a designated port.

The data processing means 124 of the switch 12 receives a packet from another switch or the like connected to the switch 12. When receiving a packet, the data processing means 124 transmits part of the packet, the entire packet, or a copy of the packet to the flow identification means 123. The flow identification means 123 determines whether the packet matches any entry in the flow table 125, identifies the flow of the packet, and outputs an action. The data processing means 124 receives the action in the matched entry and processes the packet.

Next, a method in which a controller 11 sets an operation authority in an entry in the flow table 125 of a switch 12 will be described. The controller 11 describes operation authority information as additional information of a control message for instructing the switch 12 to operate an entry in the flow table 125. Alternatively, the controller 11 may transmit a special message for designating an operation authority to the switch 12, separately from a control message.

FIG. 7 illustrates an entry edit command transmitted from the controller 11 to the switch 12. An entry in FIG. 7 defines that, if the switch 12 receives a packet having "a" as the priority and "flow A" as the matching rule, the switch 12 queries the controller A for a process as the action. The controller 11 transmits the entry in FIG. 7 to the switch 12 and sets the entry in FIG. 7 in the flow table 125 of the switch 12. In addition, the field describing "Others: ReadOnly" indicates the operation authority in the entry in FIG. 7. The operation authority target can be designated as an individual controller such as the controller A, B, or the like or as a group of controllers. Alternatively, the operation authority target can be designated by a macro using a relationship between a controller to which the permission is designated and another controller. In FIG. 7, the controllers other than the controller to which the authority is designated are only permitted to execute reading only. The entry edit command in FIG. 7 gives the operation authority to the controller A. Thus, "Others: ReadOnly" indicates that the controllers other than the controller A are permitted to execute reading only.

Next, the flow table management means 122 will be described. As illustrated in FIG. 8, the flow table management means 122 includes an authority management and determination means 1221, an additional entry information storage means 1222, and a flow table operation means 1223.

First, the authority management and determination means 1221 includes an entry operation authority management and determination means 12211 and a flow range determination means 12212. The entry operation authority management and determination means 12211 is connected to the control communication means 121, the flow range determination means 12212, the additional entry information storage means 1222, and the flow table operation means 1223. The flow range determination means 12212 is connected to the flow table operation means 1223. In addition, the additional entry information storage means 1222 is connected to the flow table operation means 1223. The flow table operation means 1223 is connected to the flow table 125.

In response to an entry operation request from the controller 11 as illustrated in FIG. 7, the authority management and determination means 1221 determines the authority of the controller 11 and executes processing in accordance with the determination result.

The additional entry information storage means 1222 stores authority information corresponding to the entries in the flow table 125. For example, the authority information in an entry includes a permission uniquely defined for each controller and owner information (namely, information indicating a controller that has set the entry).

The entry operation authority management and determination means 12211 manages the entry operation authorities and determines whether to permit an operation in response to a request for operating an entry from a controller 11. When an operation authority in an entry in the flow table 125 is set via the control communication means 121, the entry operation authority management and determination means 12211 stores information about the operation authority in the additional entry information storage means 1222. When the controller 11 refers to and edits an entry via the control communication means 121, the entry operation authority management and determination means 12211 refers to the operation authority information in the additional entry information storage means 1222. In addition, if editing of an entry includes change of the matching rule, the entry operation authority management and determination means 12211 queries the flow range determination means 12212 and determines whether to permit the operation in view of the supplied determination result.

When the controller 11 registers an entry, the flow range determination means 12212 determines whether to permit the control operation of the controller 11. More specifically, the flow range determination means 12212 determines whether the control operation requested by the controller 11 falls within a flow range in which the control operation of the controller 11 is permitted. For example, the flow range determination means 12212 determines whether to permit the control operation of the controller 11, in view of an inclusion relation of matching rules (namely, a flow identification condition). For example, in the case of flows having a matching rule only determining whether a packet matches a predetermined source IP address (elements other than the source IP address are arbitrary (wildcards)), the flow range determination means 12212 determines that flows having a matching rule determining whether a packet matches the predetermined source IP address or a predetermined VLAN (Virtual Local Area) tag are included.

For example, it is possible to assume that a permissible flow range can be a union of matching rules of entries having actions for querying a certain controller. In addition, it is possible to assume that an invalid flow range includes entries that have actions for querying other controllers or that have matching rules with a priority higher than that of the entry used as the permissible range ground.

FIG. 9 illustrates entries in the flow table 125 and additional entry information stored in the additional entry information storage means 1222, the entries and the information being associated with each other. An example of the determination operation of the flow range determination means 12212 will be described with reference to FIG. 9. First, the first to third columns in the flow table represent priorities, matching rules, and actions, respectively. The first and second columns in the additional entry information represent operation authorities and owners, respectively, corresponding to the entries in the flow table 125. As in FIG. 6, in FIG. 9, the entries are arranged in descending order of priority. In FIG. 9, the controller A limits the flow range in which the controller B controls communication. "Controller: A" in the action column signifies that the switch 12 queries the controller A for a process when the switch 12 receives a packet matching flow A. There are two conditions that permit the controller B to register an entry having flow B as a matching rule. The first condition is that the flow range indicated by flow B is included in the flow range indicated by flow C, which is a matching rule in an entry of the controller A having an action for querying the controller B. The second condition is that the entry priority relationship satisfies a−n<a−k<a.

(Operation)

FIGS. 10 to 13 are flow charts illustrating an operation of the communication system 1 according to the second exemplary embodiment. Next, the operation according to the second exemplary embodiment will be described with reference to these flow charts.

FIG. 10 is a flow chart illustrating an operation executed when the switch 12 receives a packet according to the second exemplary embodiment.

First, the data processing means 124 receives a packet from another communication apparatus (not illustrated) on a network (step S11). Next, the flow identification means 123 determines whether the incoming packet matches a matching rule of an entry in the flow table 125 (step S12).

If the flow table 125 includes an entry matching the incoming packet, the flow identification means 123 determines whether the action in the matched entry is a query to a designated controller for a process (step S13).

If the flow identification means 123 determines that the action in the matched entry is a query to a designated controller for a process, the process query means 1211 queries the designated controller for a process (step S14).

If the flow identification means 123 determines that the action is not a query to a designated controller for a process, the data processing means 124 processes the packet in accordance with the action in the matched entry (step S16). For example, the data processing means 124 forwards the incoming packet to another communication apparatus or discards the incoming packet.

In step S12, if the flow identification means 123 determines that the packet does not match a matching rule of any entry in the flow table, the control communication means 121 queries a controller set as default for a process (step S15).

FIGS. 11 and 12 are flow charts illustrating an operation executed when the switch 12 receives an entry edit command from a controller 11.

First, the control communication means 121 receives an entry edit command from a controller 11 (step S21).

Next, the flow table management means 122 determines whether the received command indicates addition of an entry in the flow table 125 (step S22).

In step S22, if the flow table management means 122 determines that the received command does not indicate addition of an entry in the flow table, step S23 is executed. The entry operation authority management and determination means 12211 refers to the authority information stored in the additional entry information storage means 1222 (step S23). Next, the entry operation authority management and determination means 12211 determines whether the controller that has transmitted the command is permitted to edit the target entry (step S24).

In step S22, if the flow table management means 122 determines that the entry edit command indicates addition of an entry in the flow table, step S26 is executed. Step S26 will be described below.

In step S24, if the entry operation authority management and determination means 12211 determines that the controller that has transmitted the command is permitted to edit the target entry, the authority management and determination means 1221 executes step S25. The authority management and determination means 1221 determines whether the entry edit command indicates change of the priority or the matching rule in the entry (step S25).

In step S24, if the entry operation authority management and determination means 12211 determines that the controller that has transmitted the entry edit command is not permitted to edit the target entry, the flow table management means 122 rejects the operation command (step S30).

In step S25, if the authority management and determination means 1221 determines that the entry edit command indicates change of the priority or the matching rule in the entry, the flow range determination means 12212 executes step S26. The flow range determination means 12212 determines whether the priority or the matching rule in the entry changed as requested by the entry edit command falls within the range permitted for the requesting controller (step S26).

In step S26, if the flow range determination means 12212 determines that the priority or the matching rule in the entry changed as requested by the entry edit command falls within the range permitted for the controller, the entry operation authority management and determination means 12211 executes step S27. The entry operation authority management and determination means 12211 determines whether addition or change of designation of an entry operation authority is needed or whether no addition or change of designation of an entry operation authority is needed (step S27).

In step S27, if the entry operation authority management and determination means 12211 determines that addition or change of designation of an entry operation authority is needed, the entry operation authority management and determination means 12211 executes step S28. The entry operation authority management and determination means 12211 edits the entry operation authority in the additional entry information storage means 1222 (step S28). Next, the flow table operation means 1223 executes the operation command (step S29). In step S27, if the entry operation authority management and determination means 12211 determines that no addition or change of designation of an entry operation authority is needed, the process in step S28 is skipped. Instead, step S29 is executed.

For example, to manage a switch 12, a controller 11 can transmit a command for referring to the flow table to a switch 12. This command will be hereinafter referred to as a flow table reference command. FIG. 13 is a flow chart illustrating an operation executed when a switch 12 receives a flow table reference command from a controller 11.

First, a switch 12 receives a flow table reference command from a controller 11 via the control communication means 121 (step S31).

Next, the entry operation authority management and determination means 12211 refers to the authority information stored in the additional entry information storage means 1222 (step S32).

After step S32, the entry operation authority management and determination means 12211 extracts an entry including reference authority of the controller that has transmitted the command (step S33).

The flow table operation means 1223 acquires the entry extracted in step S33 from the flow table 125 (step S34).

The entry operation authority management and determination means 12211 acquires additional entry information corresponding to the entry extracted in step S32 from the additional entry information storage means 1222 (step S35).

Next, the entry operation authority management and determination means 12211 duplicates the additional entry information acquired in step S35 (step S36).

Next, the entry operation authority management and determination means 12211 converts the authority information in the additional entry information duplicated in step S36 into the authority of the controller requesting reference (step S37).

Finally, the control communication means 121 transmits the entry acquired in step S34 and the additional entry information converted in step S37 to the controller 11 requesting reference (step S38).

(Advantageous Effects)

As described above, in the communication system 1 according to the second exemplary embodiment, an action for designating one of the controllers 11 is used as an action in an entry in the flow table 125. In this way, a controller to be queried for packet processing can be distinguished per flow range. As a result, for example, it is possible to determine a single controller controlling a certain flow.

In addition, each switch 12 stores authority information about controllers 11 per entry and limits operations on the entries in the flow table 125. In this way, each switch 12 limits the flow ranges that can be controlled by the controllers 11. Thus, unintended overwriting of a control policy by a different controller can be prevented.

With the above operation, a switch 12 can directly be controlled by a plurality of controllers 11 based on a determined control range and authority range. Thus, according to the second exemplary embodiment, even when there are a plurality of controllers 11 controlling a switch 12, since it is possible to determine a single controller 11 controlling an incoming packet, control of a switch 12 by a plurality of controllers 11 can be achieved.

<Third Exemplary Embodiment>
(Configuration)

Next, a third exemplary embodiment of the present invention will be described. The third exemplary embodiment is different from the second exemplary embodiment in a flow table management means 122 and a flow table 115 in a switch 12. Thus, the third exemplary embodiment will be described with a focus on the difference from the flow table management means 122, and the configurations and operations the same as those of the second exemplary embodiment will not be described.

Figure 14:
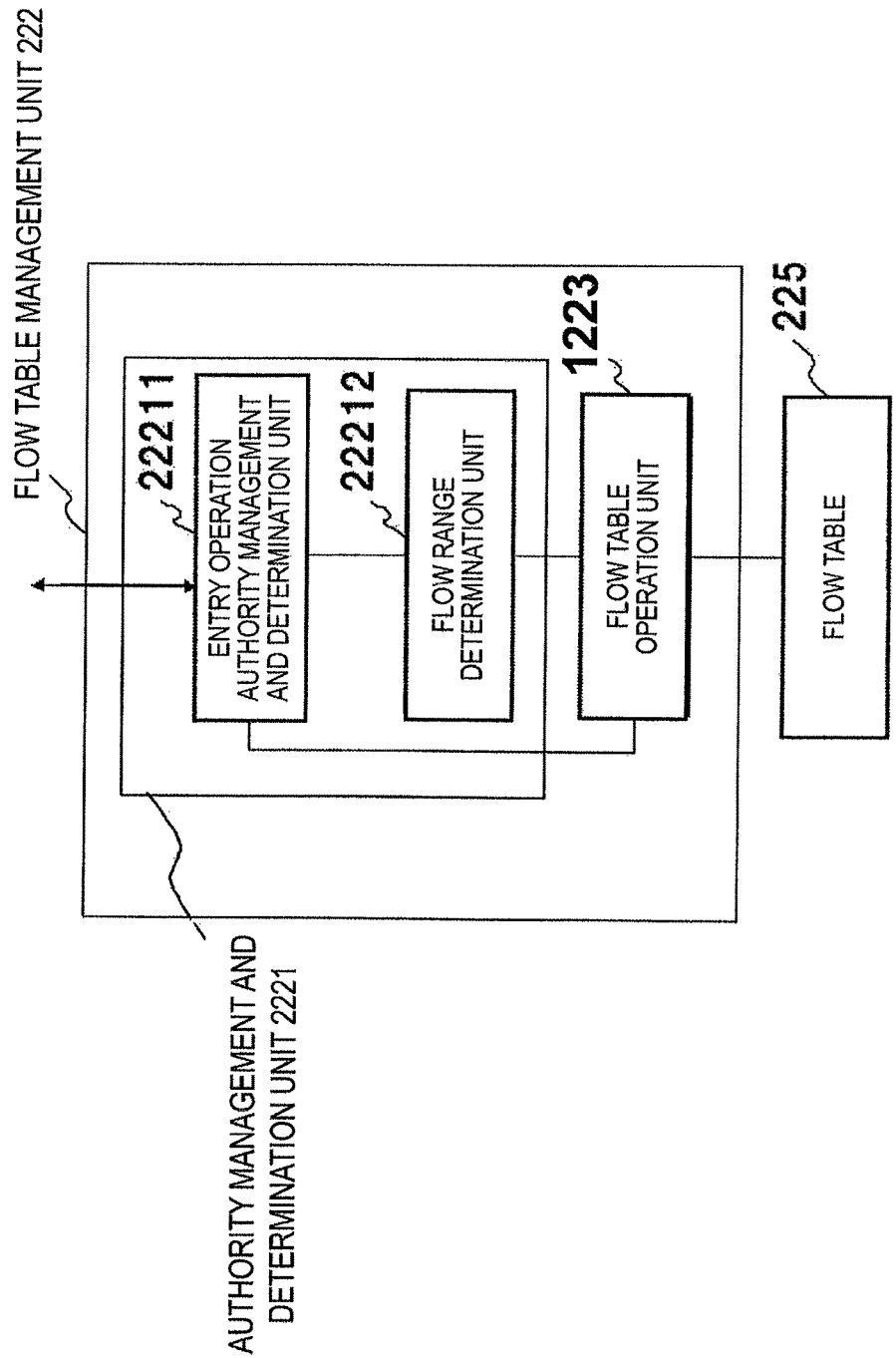
FIG. 14 illustrates a configuration example of a switch according to a third exemplary embodiment.

FIG. 14 is a block diagram illustrating the flow table management means 222 according to the third exemplary embodiment. In FIG. 14, the flow table management means 222 includes an authority management and determination means 2221 and a flow table operation means 1222. The authority management and determination means 2221 includes an entry operation authority management and determination means 22211 and a flow range determination means 22212. The entry operation authority management and determination means 22211 is connected to the control communication means 121, the flow range determination means 22212, and the flow table operation means 1222.

In addition, when compared with the flow table management means 122 according to the second exemplary embodiment, the additional entry information storage means 1222 is removed. In the third exemplary embodiment, the flow table 225 stores the information stored in the additional entry information storage means 1222 according to the second exemplary embodiment. FIG. 15 illustrates the flow table 225 according to the third exemplary embodiment. In FIG. 15, the flow table 225 stores authority information, in addition to the information stored in the flow table 125 according to the second exemplary embodiment.

(Operation)

When receiving an entry edit command from a controller 11, if additional entry information needs to be referred to or edited, the switch 12 according to the third exemplary embodiment simply needs to refer to or edit the flow table 225.

FIG. 16 is a flow chart illustrating an operation executed when the switch 12 according to the third exemplary embodiment receives a flow table reference command. The operation in FIG. 16 is different from the operation according to the second exemplary embodiment in FIG. 13 in steps after S34. The other steps that are the same as those according to the second exemplary embodiment are denoted by the same reference characters as those in FIG. 13, and description thereof will be omitted.

The entry operation authority management and determination means 22211 duplicates the entry acquired in steps S33 and S34 (step S236).

Next, the entry operation authority management and determination means 22211 converts authority information of the entry duplicated in step S236 into authority of the controller requesting reference (step S237).

Finally, the control communication means 121 notifies the controller 11 requesting reference of the entry converted in step S237 (step S238).

(Advantageous Effects)

The communication system 1 according to the third exemplary embodiment provides advantageous effects similar to those provided by the communication system 1 according to the second exemplary embodiment. Namely, an action for designating one of the controllers 11 is used as an action in an entry in the flow table 225 according to the third exemplary embodiment. In this way, a controller to be queried for packet processing can be distinguished per flow range. As a result, for example, it is possible to determine a single controller controlling a certain flow.

In addition, each switch 12 stores authority information about controllers 11 per entry and limits operations on the entries in the flow table 225. In this way, each switch 12 limits the flow ranges that can be controlled by the controllers 11. Thus, unintended overwriting of a control policy by a different controller can be prevented.

With the above operation, a switch 12 can directly be controlled by a plurality of controllers 11 within a determined control range and authority range. Thus, according to the third exemplary embodiment, even when there are a plurality of controllers 11 controlling a switch 12, since it is possible to determine a single controller 11 controlling an incoming packet, control of a switch 12 by a plurality of controllers 11 can be achieved.

<Fourth Exemplary Embodiment>
(Configuration)

Figure 17:
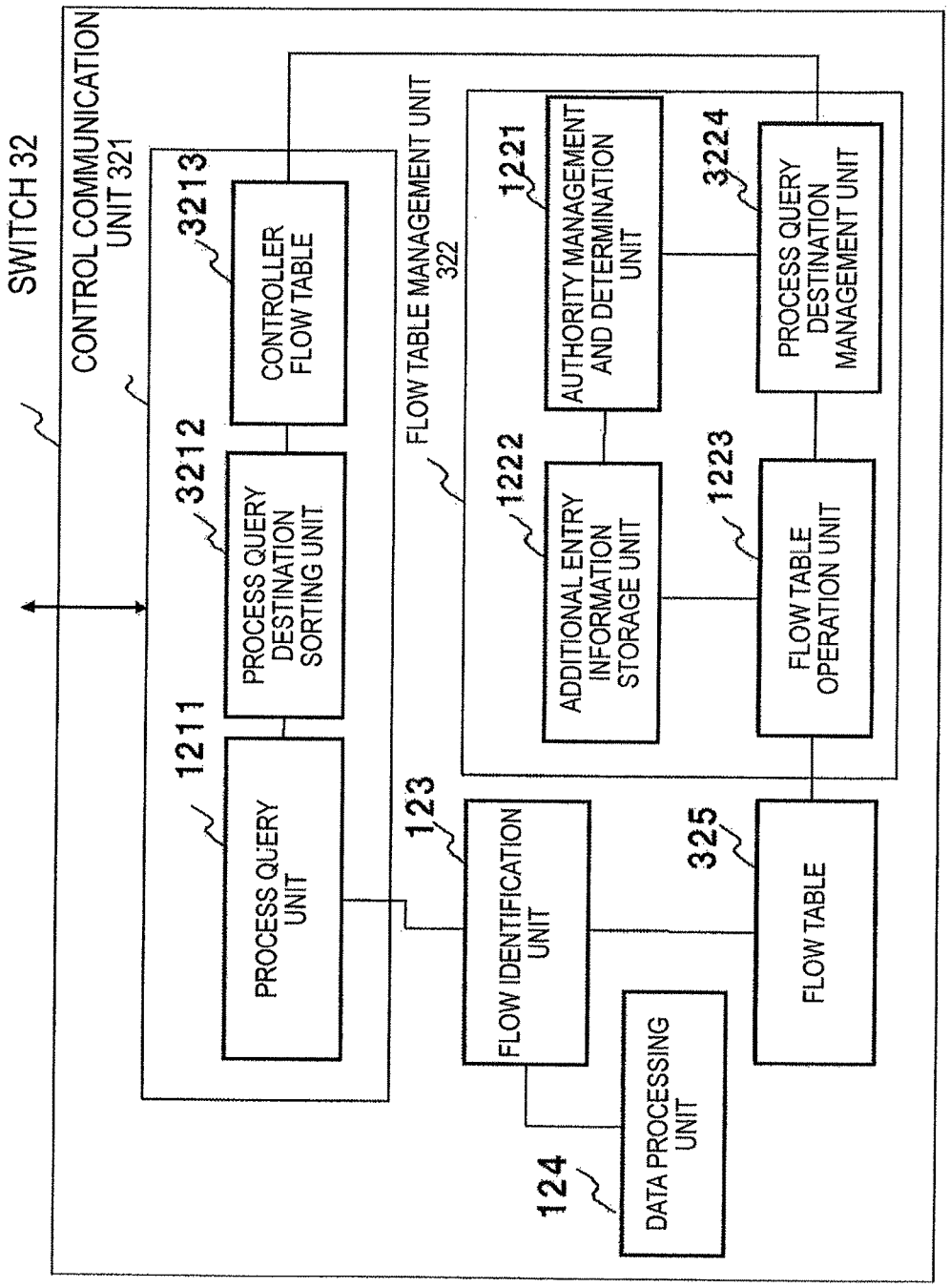
FIG. 17 illustrates a configuration example of a switch according to a fourth exemplary embodiment.

FIG. 17 illustrates a switch 32 according to a fourth exemplary embodiment. As illustrated in FIG. 17, the switch 32 according to the fourth exemplary embodiment is different from the second exemplary embodiment in a control communication means 321, a flow table management means 322, and a flow table 325. The other constituent elements are the same as those according to the second and third exemplary embodiments. In addition, the constituent elements the same as those according to the second exemplary embodiment are denoted by the same reference characters as those in FIG. 4, FIG. 5, and FIG. 8, and detailed description thereof will be omitted.

In the fourth exemplary embodiment, there is no need to register a query to a designated controller for a process as an action in the flow table 325. Such case in which a query to a designated controller for a process is not registered as an action in the flow table 325 will be described.

In the fourth exemplary embodiment, the control communication means 321 includes the process query means 1211, a process query destination sorting means 3212, and a controller flow table 3213. In addition, unlike the second exemplary embodiment, the flow table management means 322 according to the fourth exemplary embodiment includes a process query destination management means 3224.

Next, these newly-added elements according to the fourth exemplary embodiment will be described. First, the process query destination sorting means 3212 selects a controller 11 to be queried for a packet processing content. In addition, the process query destination sorting means 3212 converts an instruction for querying an arbitrary controller for a process into an instruction for querying a designated controller for a process.

FIG. 18 illustrates the controller flow table 3213. In FIG. 18, the controller flow table 3213 includes, as an entry, at least a priority, a matching rule, and an identifier of a destination controller. An arbitrary identifier may be used, as long as a controller can be uniquely defined by the identifier.

In addition, the process query destination management means 3224 manages process query destination sorting references and converts the action section in an entry.

(Operation)

FIGS. 19 and 20 are flow charts illustrating operations of the switch 32 according to the fourth exemplary embodiment of the present invention. Steps the same as those according to the second exemplary embodiment are denoted by the same reference characters as those in FIG. 10, and detailed description thereof will be omitted.

FIG. 19 is a flow chart illustrating an operation executed when the switch 32 receives a packet. First, the switch 32 receives a packet and determines whether the incoming packet matches a matching rule in an entry in the flow table (steps S11, S12).

In step S12, if the switch 32 determines that the incoming packet matches a matching rule in an entry in the flow table, the flow identification means 123 determines whether an action in the entry having the matched matching rule is a query to a controller for a process (step S13).

In step S13, if the flow identification means 123 determines that the action in the matched entry is a query to a controller for a process, step S317 is executed. The process query destination sorting means 3212 refers to the controller flow table 3213 to search for a controller to be queried for a process executed on the incoming packet (step S317). More specifically, the process query destination sorting means 3212 searches the controller flow table 3213 for an entry having a matching rule corresponding to the matching rule matching the incoming packet. The process query destination sorting means 3212 acquires a destination controller in the found entry as a query destination.

Next, the process query destination sorting means 3212 converts the query to an arbitrary controller for a process into a query to the found controller designated as the destination for a process (step S318).

Next, the process query means 1211 queries the designated controller for a process (step S14).

FIG. 20 is a flow chart illustrating an operation executed when the switch 32 is instructed by a controller 11 to register an entry for designating a process query destination. In the second and third exemplary embodiments, when the switch 12 receives an instruction for registering an entry, the switch 12 simply registers the entry in the flow table. However, in the fourth exemplary embodiment, the switch 12 also needs to register the entry in the controller flow table 3213.

First, the control communication means 321 receives an entry registration instruction for designating a process query destination from a controller 11 (step S341).

Next, the authority management and determination means 1221 determines the authority of the entry, as in the second exemplary embodiment (step S342).

Next, the process query destination management means 3224 registers the entry having a matching rule as a key and a controller identifier as a value in the controller flow table 3213 and adds a priority to the entry (step S343).

Next, the process query destination management means 3224 replaces the action corresponding to the entry registration instruction with a query to an arbitrary controller for a process (step S344).

Finally, the flow table operation means 1223 registers the entry in the flow table 325 (step S345).

(Advantageous Effects)

The communication system 1 according to the fourth exemplary embodiment provides advantageous effects similar to those provided by the communication system 1 according to the second and third exemplary embodiments. Namely, the switch 32 stores a query destination controller in the control flow table 3213, for an action querying a controller for a process in an entry in the flow table 325 according to the fourth exemplary embodiment. In this way, a controller to be queried for packet processing can be distinguished per flow range. As a result, for example, it is possible to determine a single controller controlling a certain flow.

In addition, each switch 32 stores authority information about controllers 11 per entry and limits operations on the entries in the flow table 325. In this way, each switch 32 limits the flow ranges that can be controlled by the controllers 11. Thus, unintended overwriting of a control policy by a different controller can be prevented.

With the above operation, a switch 32 can directly be controlled by a plurality of controllers 11 within a determined control range and authority range. Thus, according to the fourth exemplary embodiment, even when there are a plurality of controllers 11 controlling a switch 32, since it is possible to determine a single controller 11 controlling an incoming packet, control of a switch 32 by a plurality of controllers 11 can be achieved.

<Fifth Exemplary Embodiment>

(Configuration)

Figure 21:
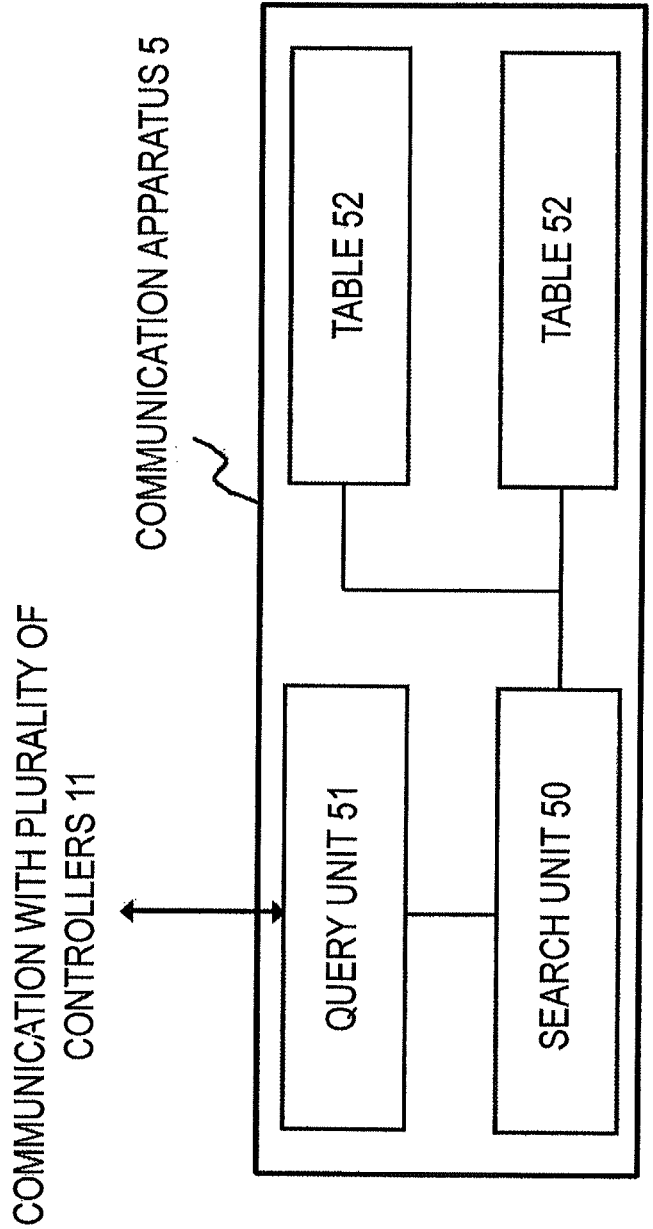
FIG. 21 illustrates a configuration example of a communication apparatus according to a fifth exemplary embodiment.

FIG. 21 illustrates a configuration example of a communication apparatus 5 according to a fifth exemplary embodiment.

The communication apparatus 5 includes a search means 50, a query means 51, and a plurality of tables 52.

The communication apparatus 5 communicates with a plurality of controllers 11 and processes a packet in accordance with a control command from a controller 11.

The communication apparatus 5 is an apparatus having a communication function such as a mobile terminal, a mobile router, or a server or is a packet forwarding apparatus (such as a switch or a router) on a network. The mobile router is a relay terminal on a network such as a mobile phone 3G network or a wireless LAN. The communication apparatus 5 may be implemented as software on a mobile terminal, a mobile router, a server, or the like.

Each of the plurality of tables 52 stores entries transmitted from controllers 11. For example, each entry includes a rule for identifying a packet (namely, a rule for identifying a flow to which a packet belongs) and a packet processing method corresponding to the rule.

The search means 50 searches at least one of the plurality of tables 52 for an entry corresponding to a packet received by the communication apparatus 5. For example, the search means 50 checks the header of the incoming packet against entry rules to search for an entry corresponding to the incoming packet. If the search means 50 finds an entry corresponding to the incoming packet, the search means 50 processes the incoming packet in accordance with a processing method defined in the found entry. For example, in accordance with the entry, the search means 50 forwards the incoming packet to a communication port of the communication apparatus 5, rewrites the header of the incoming packet, discards the incoming packet, or searches another table.

The search means 50 may be provided for each of the plurality of tables 52.

Each table 52 is associated with at least one of the plurality of controllers 11 controlling the communication apparatus 5. For example, tables A and B correspond to the controllers A and B, respectively.

The query means 51 communicates with at least one of the plurality of controllers 11. By communicating with a controller 11, the query means 51 queries the controller 11 for an entry to be set in a table 52.

If the search means 50 detects a predetermined condition as a result of searching a table 52, the query means 51 queries a controller 11, which is associated with the table 52 in which the search means 50 has detected the predetermined condition, for an entry corresponding to the incoming packet.

For example, when the search means 50 finds an entry corresponding to the incoming packet, if the processing method defined in the entry is a query to a controller or if an entry corresponding to the incoming packet does not exist, the query means 51 queries a controller 11, which is associated with the table 52 in which the entry has been found, for a processing method to be executed on the incoming packet. If the controller A is associated with a table 52 in which the entry has been found, the query means 51 queries the controller A for a processing method to be executed on the incoming packet.

(Operation)

Figure 22:
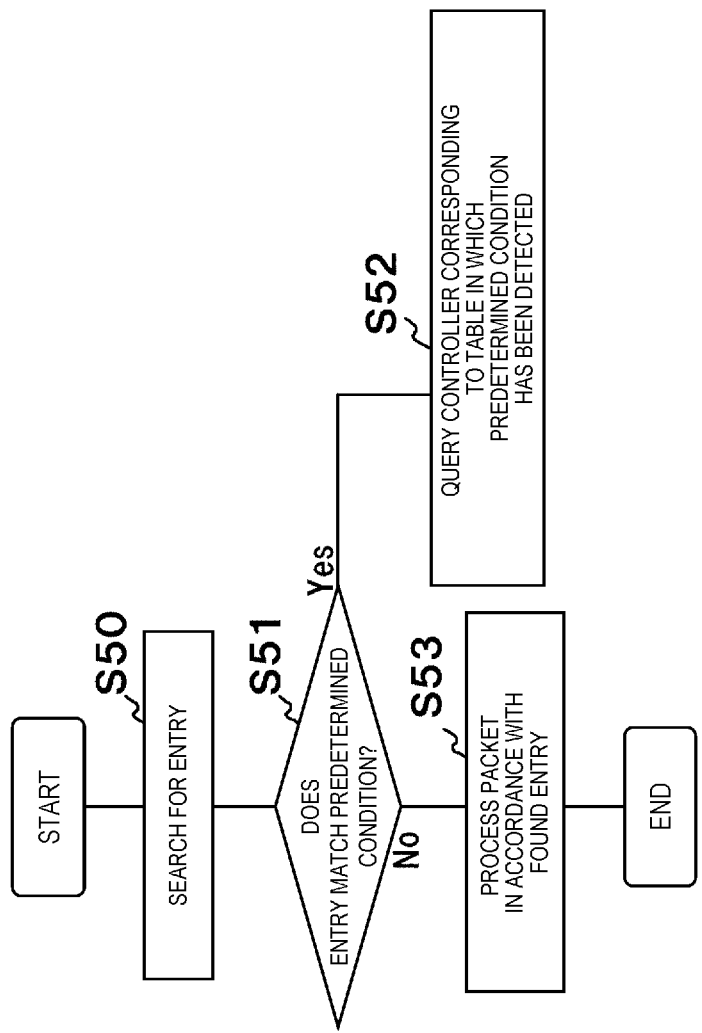
FIG. 22 illustrates a flow chart illustrating an operation example according to the fifth exemplary embodiment.

An operation according to the fifth exemplary embodiment will be described with reference to a flow chart in FIG. 22.

The search means 50 searches the tables 52 for an entry corresponding to an incoming packet. For example, the search means 50 searches the tables 52 in the ascending order of the identification numbers (step S50).

If the search means 50 detects a predetermined condition (Yes in step S51), the query means 51 queries a controller 11 associated with the table 52 in which the predetermined condition has been found for a processing method to be executed on the incoming packet (step S52). For example, the predetermined condition is determined if the processing method defined in the entry found by the search means 50 is a query to a controller. However, if an entry corresponding to the incoming packet does not exist (mishit), the query means 51 may query a controller 11 corresponding to the table 52 in which the mishit is detected.

If the search means 50 finds a processing method corresponding to the incoming packet (a process other than a query to a controller) (namely, if the predetermined condition is not detected), the search means 50 processes the incoming packet in accordance with the found processing method (step S53).

(Advantageous Effects)

Each of the plurality of tables 52 of the communication apparatus 5 is associated with at least one controller 11. The communication apparatus 5 searches a table 52 for a processing method to be executed on an incoming packet and queries a controller 11 associated with a table 52 in which the predetermined condition has been detected for a processing method to be executed on the incoming packet. Thus, by referring to the correspondence relationship between each table 52 and at least one controller 11, the communication apparatus 5 can identify a controller 11 to be queried from among a plurality of controllers 11.

<Sixth Exemplary Embodiment>

A sixth exemplary embodiment specifically illustrates a configuration example of a table 52 according to the fifth exemplary embodiment.

(Configuration)

Since the communication apparatus 5 according to the sixth exemplary embodiment has the same configuration as that according to the fifth exemplary embodiment, detailed description thereof will be omitted.

(Operation)

A configuration example of a table 52 according to the sixth exemplary embodiment and an operation of the communication apparatus 5 will be described with reference to FIG. 23.

The communication apparatus 5 has two tables 52. The number of tables 52 is an example, and the present invention is not limited to the configuration example in FIG. 23.

As in the example illustrated in FIG. 6, each entry in the tables 52 has fields in which a priority, a matching rule, and an action are defined.

Each table 52 is allocated with an identifier (Table ID) for identifying the table. In FIG. 23, the communication apparatus 5 has the tables 52 whose table IDs are "0" and "1" (hereinafter, the tables 52 will be referred to as Table (0) and Table (1)).

Each table 52 is associated with at least one of the plurality of controllers 11. For example, in FIG. 23, Tables (0) and (1) are associated with (or allocated to) the controllers A and B, respectively. For example, the query means 51 has a management table indicating a correspondence relationship between a plurality of controllers 11 and a table 52 and refers to the management table, to query a controller 11 corresponding to a table 52.

For example, in response to a request from a controller 11, the communication apparatus 5 associates the controller 11 with a table 52. Alternatively, the communication apparatus 5 may previously associate a table 52 with a controller 11, for example, when executing an initial operation or when being started.

Figure 23:
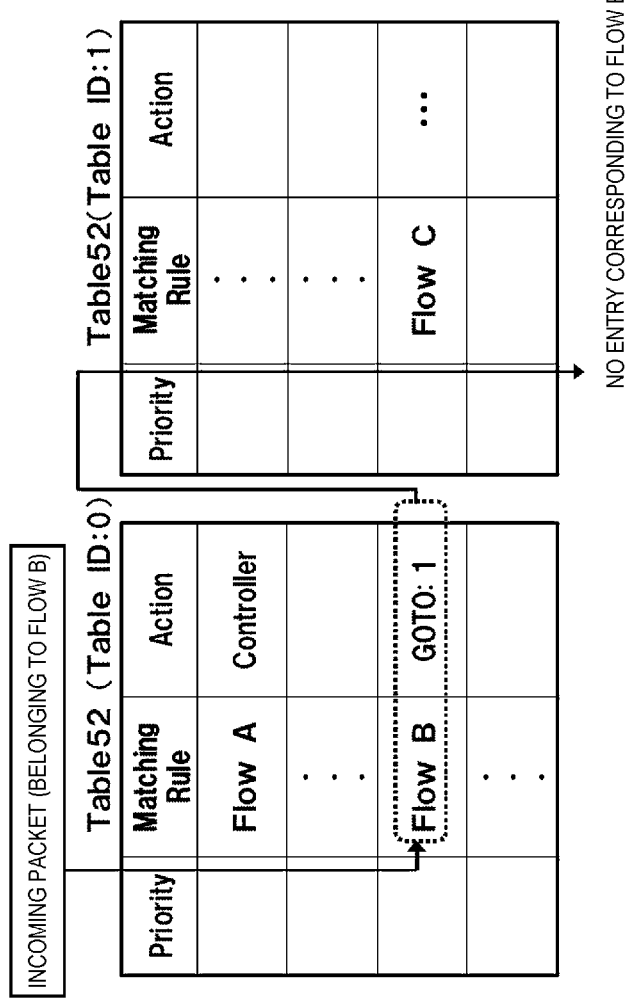
FIG. 23 illustrates an operation example according to a sixth exemplary embodiment.

Table (0) includes an entry defining that a process for querying a controller is executed on packets belonging to Flow A (the first entry in Table (0) in FIG. 23). In addition, Table (0) includes an entry in which an action "GOTO:1" is set for packets belonging to Flow B. The action "GOTO:1" signifies change of the search target table from Table (0) to Table (1) for packets belonging to Flow B. For example, one of the plurality of controllers 11 may previously set these entries at a predetermined timing such as when an initial setting of the communication apparatus 5 is executed. While an action for changing the search target table is used in the present invention, an arbitrary action may be used, as long as a predetermined table is searched when the action is executed.

Depending on the flow range (namely, depending on the range of a condition defined by a flow matching rule), a controller 11 may select a table 52 in which an entry is to be set. For example, a controller 11 may select a table 52 in which an entry is to be set, depending on a condition determined by a VLAN ID or a port number (Inport number) that has received an incoming packet. For example, for a flow in which the VLAN ID or Inport number is within a predetermined range (range (a)), a controller 11 sets the entry in Table (0). In contrast, for a flow in which the VLAN ID or Inport number is within another predetermined range (range (b)), the controller 11 sets the entry in Table (1). Since the condition of the flow range is an example, the present invention is not limited thereto.

In Table (1), a predetermined action (packet forwarding from a certain port, rewriting of the header, etc.) corresponding to packets belonging to Flow C is defined.

The entries illustrated in FIG. 23 are examples. Entries other than those illustrated in FIG. 23 may be set.

If the communication apparatus 5 receives a packet (a packet belonging to Flow B), the search means 50 searches the tables 52. For example, the search means 50 searches the tables 52 in the ascending order of the Table IDs. The search means 50 may start searching a table 52 of an arbitrary Table ID. In FIG. 23, the search means 50 searches Table (0) first. For example, the search means 50 searches the entries in each table in descending order.

As a result of searching Table (0) for an entry corresponding to an incoming packet, the search means 50 detects an entry in which the action "GOTO:1" is defined. In accordance with the entry, the search means 50 changes the search target table from Table (0) to Table (1).

As a result of searching Table (1), the search means 50 detects that no entry corresponding to Flow B exists in Table (1) (mishit). Namely, the search means 50 detects the predetermined condition as mishit in Table (1).

Since the search means 50 has detected the predetermined condition, the query means 51 queries a controller 11 (for example, the controller B) corresponding to Table (1) for an entry corresponding to the incoming packet belonging to Flow B.

After queried, the controller 11 (for example, the controller B) sets an entry corresponding to the query in a predetermined table 52. The controller 11 may select a table 52 in which an entry is to be set, based on an access authority corresponding to each table 52 of the communication apparatus 5 (which will be described in detail in the following exemplary embodiment).

Figure 24:
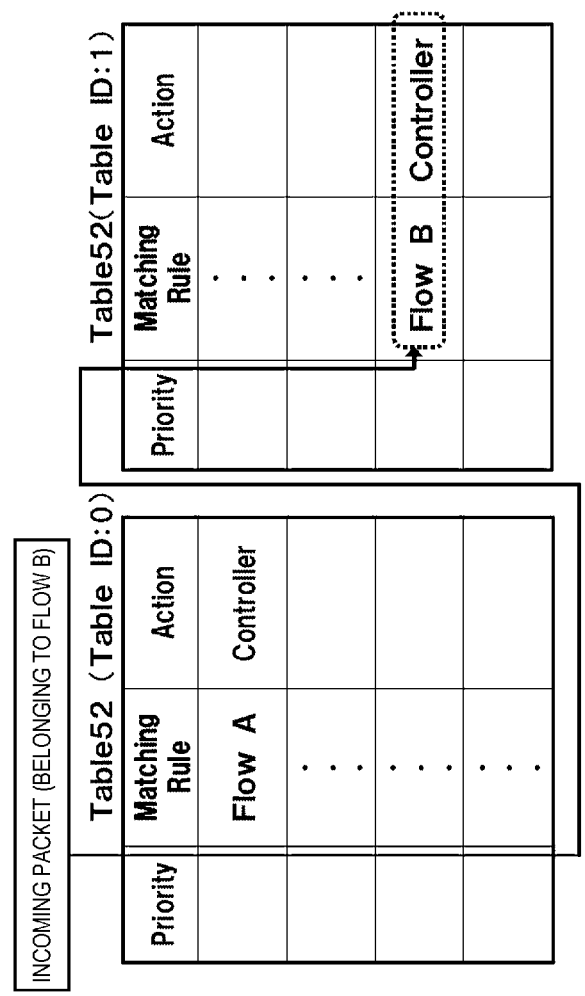
FIG. 24 illustrates an operation example according to the sixth exemplary embodiment.

Another configuration example of the table 52 and another operation of the communication apparatus 5 according to the sixth exemplary embodiment will be described with reference to FIG. 24. While the difference from FIG. 23 will be described in detail, description of the same portions as those in FIG. 23 will be omitted.

Table (0) does not have an entry corresponding to Flow B. Table (1) has an entry in which a process for querying a controller is defined for Flow B.

As a result of searching Table (0), if the search means 50 detects that no entry corresponding to Flow B exists in Table (0) (mishit), the search means 50 changes the search target table from Table (0) to Table (1).

The search means 50 detects an entry corresponding to Flow B in Table (1). A process for querying a controller is defined as an action in the detected entry. Namely, in Table (1), the search means 50 detects the predetermined condition as a hit to an entry in which a process for querying a controller is defined.

Since the search means 50 has detected the predetermined condition, the query means 51 queries a controller 11 (for example, the controller B) corresponding to Table (1) for an entry corresponding to the incoming packet belonging to Flow B.

After queried, the controller 11 (for example, the controller B) sets an entry corresponding to the query in a predetermined table 52. The controller 11 may select a table 52 in which an entry is to be set, based on an access authority corresponding to each table 52 of the communication apparatus 5, which will be described in detail in the following exemplary embodiment.

(Advantageous Effects)

Each of the plurality of tables 52 of the communication apparatus 5 is associated with (or allocated to) at least one controller 11. The communication apparatus 5 searches a table 52 for a processing method to be executed on an incoming packet and queries a controller 11 associated with a table 52 in which the predetermined condition has been detected for a processing method to be executed on the incoming packet. Thus, by referring to the correspondence relationship between each table 52 and at least one controller 11, the communication apparatus 5 can identify a controller 11 to be queried from among a plurality of controllers 11.

<Seventh Exemplary Embodiment>

(Configuration)

Figure 25:
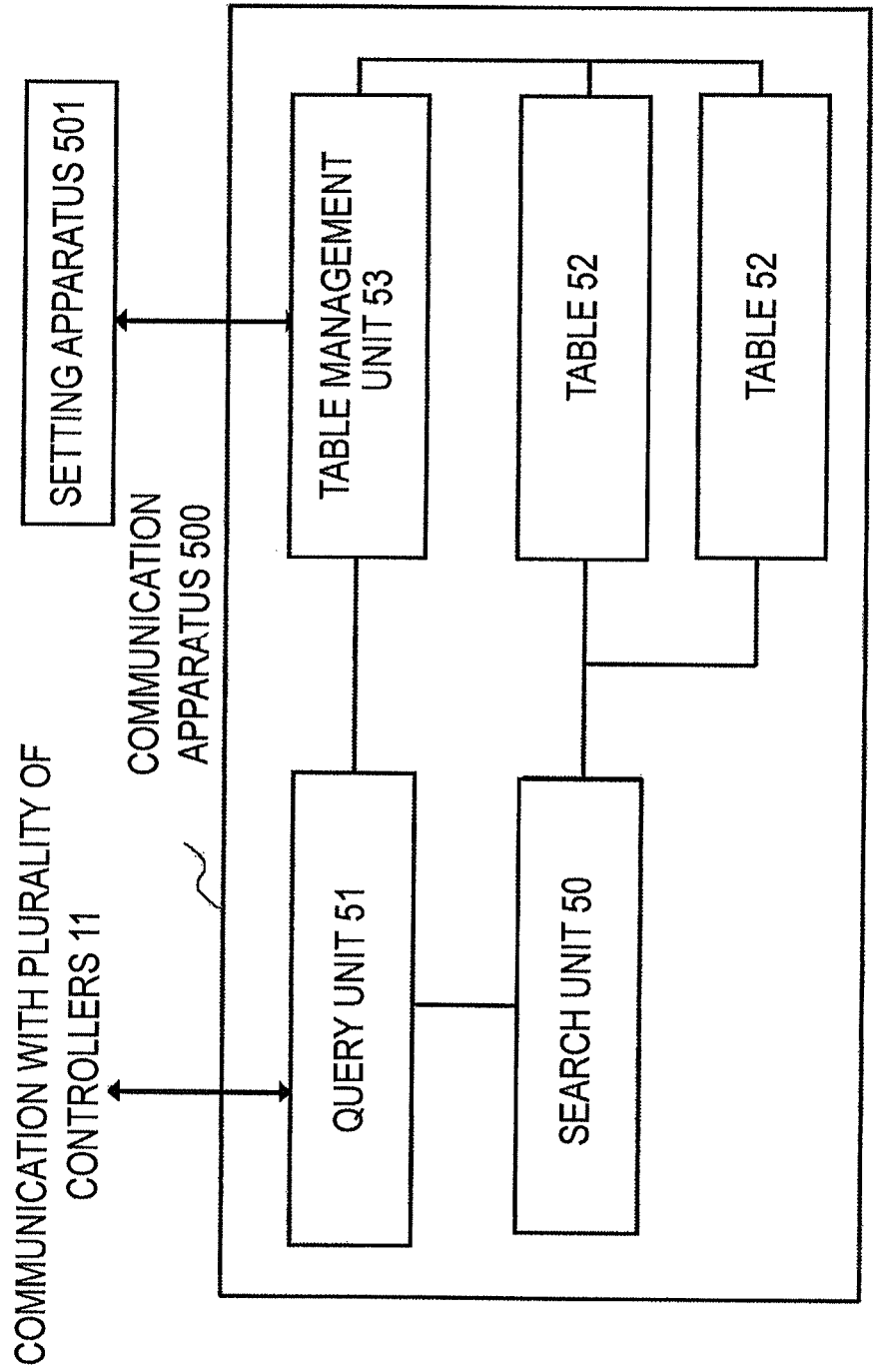
FIG. 25 illustrates a configuration example of a communication apparatus according to a seventh exemplary embodiment.

FIG. 25 illustrates a configuration example of a communication apparatus 500 according to a seventh exemplary embodiment.

The communication apparatus 500 includes a table management means 53. Other configurations are the same as those of the communication apparatus 5 according to the above exemplary embodiment.

Based on the authority of a controller 11 set to each of a plurality of tables 52, the table management means 53 manages the tables 52.

For example, the table management means 53 manages the tables 52 based on the following methods. The following management methods are examples, and functions of the table management means 53 are not limited to the following examples.

(1) Management of controller authority for referring to and operating a table
(2) Management of request for setting authority for referring to and operating a table
(3) Management of a request for associating a table with a controller Next, each of the management methods will be described.

(1) Management of Controller Authority for Referring to and Operating a Table

FIG. 26 is an access authority management table 530 included in the table management means 53. In the table 530, the authority of each controller 11 for a table 52 is defined. Since FIG. 26 is an example, the configuration of the access authority management table 530 is not limited to FIG. 26. For example, the access authority management table 530 may manage a controller authority per entry in each table 52.

In addition, the table management means 53 does not necessarily include the access authority management table 530. For example, the table management means 53 may include the access authority of each controller in each entry in each table 52, to manage the controller authority.

The table management means 53 refers to the access authority management table 530 and manages a request for accessing a table 52 from each controller 11. For example, based on a command about an access request transmitted from a controller 11, the table management means 53 refers to the authority of the controller 11 and determines whether to execute the command.

In FIG. 26, the controller A has the authority for referring to and operating (rewriting or changing) both Table (0) and Table (1). While the controller B has the authority for referring to and operating Table (1), the controller B has only the authority for referring to Table (0).

For example, if the table management means 53 receives a request for changing an entry in Table (0) from the controller A, the table management means 53 refers to the table 530 and checks the authority of the controller A. Since the table management means 53 determines that the controller A is permitted to refer to and operate Table (0), the table management means 53 permits the request from the controller A.

For example, if the table management means 53 receives a request for changing an entry in Table (0) from the controller B, the table management means 53 refers to the table 530 and checks the authority of the controller B. Since the table management means 53 determines that the controller B is permitted only to refer to Table (0), the table management means 53 rejects the request from the controller B.

(2) Management of Request for Setting Authority for Referring to and Operating a Table A controller 11 transmits a request for changing an authority with respect to a table 52 to the communication apparatus 500.

The table management means 53 determines whether to accept the request for changing an authority.

For example, the table management means 53 includes a change authority management table 531. The table management means 53 refers to this table to determine whether to accept a request for changing an authority transmitted from a controller 11.

FIG. 27 illustrates a configuration example of the change authority management table 531. Since FIG. 27 is an example, the configuration of the change authority management table 531 is not limited to FIG. 27.

"Controller ID" in FIG. 27 lists the IDs of source controllers 11 that transmit a request for changing an authority. "Table ID" lists the IDs of the tables 52 to which a request for changing an authority is directed. The first entry in the table 531 in FIG. 27 defines the authority of the controller A. The table management means 53 refers to this entry when the controller A transmits a request for changing an authority with respect to Table (0). The first entry in the table 531 signifies that the controller A has the authority for changing both access authorities (authorities for referring to and changing the table) of the controllers A and B with respect to Table (0). Namely, regarding Table (0), the controller A has the authority for changing access authorities of both the controllers A and B. In addition, the first entry in the table 531 signifies that the controller A has the authority for changing access authorities for both reference and operation.

FIG. 28 illustrates an authority change request command transmitted from a controller 11.

"Table ID" is the ID of a table 52 to which the authority change request is directed.

"Controller ID" is the ID of a controller that has transmitted the change request command and the ID of a controller to which the authority change request is directed. Namely, the change request command in FIG. 28 is a request transmitted from the controller A for changing the access authority of the controller B.

"Command" indicates the content of the authority change request. The authority request command in FIG. 28 is a command transmitted from the controller A to request the communication apparatus 500 to set the operation authority (for changing an entry, for example) of the controller B with respect to Table (0).

When receiving the change request command, the table management means 53 refers to the content of the command and the change authority management table 531 and determines whether to accept the change request command.

In FIG. 28, the source controller that has transmitted the change request command is the controller A, and the table 52 to which the authority change is directed is Table (0). Thus, the table management means 53 checks the first entry in the table 531 in FIG. 27. From the first entry in the table 531, the table management means 53 determines that the controller A has both the authority for changing authorities of the controllers A and B and the authority for changing access authorities for both reference and operation. Thus, the table management means 53 permits the change request command in FIG. 28 and sets the access authority that allows the controller B to modify/change an entry in Table (0).

(3) Management of a Request for Associating a Table with a Controller A Controller 11 Transmits a Setting Request for Associating a Table 52 with a Controller 11 to the Communication Apparatus 500.

The table management means 53 determines whether to accept this association setting request.

For example, the table management means 53 includes a change authority management table 532. By referring to this table, the table management means 53 determines whether to accept an authority change request transmitted from a controller 11.

FIG. 29 illustrates a configuration example of the change authority management table 532. Since FIG. 29 is an example, the configuration of the change authority management table 532 is not limited to FIG. 29.

"Controller ID" in FIG. 29 lists the IDs of source controllers 11 that transmit an association setting request. "Table ID" lists the IDs of tables 52 to which an association setting request is directed. The first entry in the table 532 in FIG. 29 defines the setting authority of the controller A, for an association setting request with respect to Table (0) transmitted from the controller A. The first entry in the table 532 signifies that the controller A has the authority for associating both the controllers A and B with Table (0). Namely, the first entry in FIG. 29 signifies that the controller A has the authority for associating the controller A with Table (0) and the authority for associating the controller B with Table (0). The second entry in the table 532 signifies that the controller B does not have the authority for changing the setting of Table (0) ("Not Permitted").

FIG. 30 illustrates an authority change request command transmitted from a controller 11.

"Table ID" indicates the ID of a table 52 to which an association setting request is directed.

"Controller ID" lists the ID of a controller that has transmitted the association setting request command and the ID of a controller to which the association setting request is directed. Namely, the association setting request command in FIG. 30 is a request transmitted from the controller B for associating Table (0) with the controller B.

"Command" signifies a request for associating the table with the controller.

When receiving an association setting request command, the table management means 53 refers to the change authority management table 532 and determines whether to accept the command.

In FIG. 30, the source controller that has transmitted the command is the controller B, and the table 52 to which the association setting is directed is Table (0). Thus, the table management means 53 checks the second entry in the table 532 in FIG. 29. From the second entry in the table 532, the table management means 53 determines that the controller B does not have the authority for associating Table (0) with the controller B. As a result, the table management means 53 rejects the command in FIG. 30.

The table management means 53 may set the authority of a controller 11 with respect to a table, based on an authority setting operation via a setting apparatus 501. For example, the table management means 53 may set the authority of a controller 11 with respect to a table, based on a command or the like inputted via the setting apparatus 501.

(Operation)

An operation example according to the seventh exemplary embodiment will be described with reference to FIG. 31.

The table management means 53 receives a command from a controller 11 (step S71). As described above, the command is a request for referring to/operating a table, a request for changing an authority, or a request for associating a table.

The table management means 53 determines whether the controller 11 has the authority corresponding to the command (step S71).

If the controller 11 that has transmitted the command has the authority (Yes in step S71), the table management means 53 executes a process corresponding to the command (step S72).

If the controller 11 that has transmitted the command does not have the authority (No in step S71), the table management means 53 rejects execution of the command (step S73).

(Advantageous Effects)

According to the seventh exemplary embodiment, the communication apparatus 500 can control the plurality of tables 52 based on the authorities of the controllers 11.

While the present invention has thus been described with reference to exemplary embodiments, the present invention is not limited thereto. Various variations conceivable by those skilled in the art can be made to the configurations or details of the present invention within the scope of the present invention. In addition, the present invention includes combinations of various exemplary embodiments.

Each of the switches according to the above exemplary embodiments can be applied to a communication terminal or another type of communication equipment as needed. The present invention is not limited to the above switches.

In addition, while a network using OpenFlow has been described in the above exemplary embodiments, the present inventions is not limited thereto. Other than OpenFlow, the present invention is applicable to an arbitrary network in which control servers or the like manage switches in a centralized manner.

In addition, each of the switches according to the above exemplary embodiments or a communication terminal or another type of communication equipment having functions equivalent to those of the switch can be realized by hardware. In addition, each of the switches according to the above exemplary embodiments or a communication terminal or another type of communication equipment having functions equivalent to those of the switch can be realized by a computer and a program executed on the computer. The program is recorded in a recording medium such as a magnetic disk or a semiconductor memory and is read by the computer when the computer is started, for example. In this way, the operation of the computer is controlled, and the computer is caused to serve as a switch according to any one of the above exemplary embodiments or a communication terminal or communication equipment having functions equivalent to those of the switch and to execute the above processing.

Note the term "means" used herein denotes at least a functional or operational unit which executes or implements the same function or operation as the corresponding means disclosed and embodied herein.

It is to be noted that the disclosure of the above Patent Literature and Non-Patent Literatures is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

1 communication system
11 controller
12, 32 switch
121, 321 control communication means (unit)
122, 222, 322 flow table management means (unit)
123 flow identification means (unit)
124 data processing means (unit)
125, 225, 325 flow table
1211 process query means (unit)
1221, 2221 authority management and determination means (unit)
1222 additional entry information storage means (unit)
1223 flow table operation means (unit)
3212 process query destination sorting means (unit)
3213 controller flow table
3224 process query destination management means (unit)
12211, 22211 entry operation authority management and determination means (unit)
12212, 22212 flow range determination means (unit)
5 communication apparatus
50 search means (unit)
51 query means (unit)
5 table
500 communication apparatus
501 setting apparatus
530 access authority management table
531 change authority management table
532 change authority management table

The invention claimed is:

1. A communication apparatus, comprising:
memory storing program instructions; and
a processor configured to execute the program instructions to:
   receive a packet;
   identify, based on flow information, a control apparatus among a plurality of control apparatus controlling the communication apparatus, wherein the flow information indicates the control apparatus corresponding to the received packet;
   send a request for a packet processing rule for the received packet to the control apparatus; and
   execute the program instructions to identify, based on a plurality of tables, the control apparatus among the plurality of the control apparatus, wherein each of the tables includes a flow entry.

2. The communication apparatus according to claim 1, wherein the processor is further configured to execute the program instructions to:
   receive the packet processing rule from the control apparatus; and process the received packet based on the packet processing rule.

3. The communication apparatus according to claim 1, wherein the processor is further configured to execute the program instructions to send the request for the packet processing rule to a default control apparatus when the received packet does not match the flow information.

4. The communication apparatus according to claim 1, wherein the flow information comprises a table that includes authorities for each of the plurality of the control apparatus.

5. The communication apparatus according to claim 1, wherein each of the tables corresponds to an authority for each of the plurality of the control apparatus.

6. A network system, comprising:
a communication apparatus; and
a plurality of control apparatus configured to control the communication apparatus,
wherein the communication apparatus comprises:
a memory storing program instructions; and
a processor configured to execute the program instructions to:
receive a packet;
identify, based on flow information, a control apparatus among the plurality of the control apparatus controlling the communication apparatus, wherein the flow information indicates the control apparatus corresponding to the received packet;
send a request for a packet processing rule for the received packet to the control apparatus; and
execute the program instructions to identify, based on a plurality of tables, the control apparatus among the plurality of the control apparatus, wherein each of the tables includes a flow entry.

7. The network system according to claim 6, wherein the processor is further configured to execute the program instructions to:
receive the packet processing rule from the control apparatus; and
process the received packet based on the packet processing rule.

8. The network system according to claim 6, wherein the processor is further configured to execute the program instructions to send the request for the packet processing rule to a default control apparatus when the received packet does not match the flow information.

9. The network system according to claim 6, wherein the flow information comprises a table that includes authorities for each of the plurality of the control apparatus.

10. The network system according to claim 6, wherein each of the tables corresponds to an authority for each of the plurality of the control apparatus.

11. A communication method, comprising:
receiving a packet;
identifying, based on flow information, a control apparatus among a plurality of control apparatus controlling a communication apparatus, wherein the flow information indicates the control apparatus corresponding to the received packet;
sending a request for a packet processing rule for the received packet to the control apparatus; and
further comprising identifying, based on a plurality of tables, the control apparatus among the plurality of the control apparatus, wherein each of the tables includes a flow entry.

12. The communication method according to claim 11, further comprising:
receiving the packet processing rule from the control apparatus; and
processing the received packet based on the packet processing rule.

13. The communication method according to claim 11, further comprising sending the request for the packet processing rule to a default control apparatus when the received packet does not match the flow information.

14. The communication method according to claim 11, wherein the flow information comprises a table that includes authorities for each of the plurality of the control apparatus.

15. The communication method according to claim 11, wherein each of the tables corresponds to an authority for each of the plurality of the control apparatus.

16. A non-transitory recording medium configured to be executed by a processor to perform the communication method, the communication method comprising:
receiving a packet;
identifying, based on flow information, a control apparatus among a plurality of control apparatus controlling a communication apparatus, wherein the flow information indicates the control apparatus corresponding to the received packet;
sending a request for a packet processing rule for the received packet to the control apparatus; and
identifying, based on a plurality of tables, the control apparatus among the plurality of the control apparatus, wherein each of the tables includes a flow entry.

17. The non-transitory recording medium according to claim 16, wherein the communication method further comprises:
receiving the packet processing rule from the control apparatus; and
processing the received packet based on the packet processing rule.

18. A communication apparatus, comprising:
memory storing program instructions; and
a processor configured to execute the program instructions to:
receive control information from a plurality of control apparatus;
receive a packet;
identify, based on flow information, a control apparatus among the plurality of control apparatus, wherein the flow information indicates the control apparatus corresponding to the received packet;
send a request for a packet processing rule for the received packet to the control apparatus; and
execute the program instructions to identify, based on a plurality of tables, the control apparatus among the plurality of the control apparatus, wherein each of the tables includes a flow entry.

* * * * *